US012748869B2

(12) United States Patent
Hayes et al.

(10) Patent No.: US 12,748,869 B2
(45) **Date of Patent: *Sep. 29, 2026**

(54) DYNAMICALLY CONTROLLING ACCESS TO LINKED CONTENT IN ELECTRONIC COMMUNICATIONS

(71) Applicant: Proofpoint, Inc., Sunnyvale, CA (US)

(72) Inventors: Conor Brian Hayes, Monte Sereno, CA (US); Michael Edward Jones, Fallbrook, CA (US); Alina V. Khayms, Sunnyvale, CA (US); Kenny Lee, Seattle, WA (US); David Jonathan Melnick, Los Angeles, CA (US); Adrian Knox Roston, Las Vegas, NV (US)

(73) Assignee: Proofpoint, Inc., Sunnyvale, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/817,490

(22) Filed: Aug. 28, 2024

(65) Prior Publication Data

US 2024/0419822 A1 Dec. 19, 2024

Related U.S. Application Data

(63) Continuation of application No. 16/875,118, filed on May 15, 2020, now Pat. No. 12,105,816.

(Continued)

(51) Int. Cl.
*H04L 9/00* (2022.01)
*G06F 21/53* (2013.01)

(Continued)

(52) U.S. Cl.
CPC .............. *G06F 21/62* (2013.01); *G06F 21/53* (2013.01); *G06F 21/567* (2013.01); *G06N 20/00* (2019.01);

(Continued)

(58) Field of Classification Search
CPC ........ G06F 21/62; G06F 21/53; G06F 21/567; G06F 2221/034; G06F 21/51;

(Continued)

(56) References Cited

U.S. PATENT DOCUMENTS 7,516,488 B1 4/2009 Kienzle et al.
8,544,090 B1 9/2013 Chen (Continued)

FOREIGN PATENT DOCUMENTS

WO WO-2012094040 A1 * 7/2012 ........... H04L 51/212

OTHER PUBLICATIONS

Sep. 15, 2020 (WO) International Search Report and Written Opinion—App. PCT/US2020/038393.

(Continued)

*Primary Examiner* — Syed M Ahsan
(74) *Attorney, Agent, or Firm* — Banner & Witcoff, Ltd.

(57) ABSTRACT

Aspects of the disclosure relate to dynamically controlling access to linked content in electronic communications. A computing platform may receive, from a user computing device, a request for a uniform resource locator associated with an email message. Subsequently, the computing platform may identify that the uniform resource locator associated with the email message corresponds to a potentially-malicious site. In response to identifying that the uniform resource locator associated with the email message corresponds to the potentially-malicious site, the computing platform may determine a risk profile associated with the request received from the user computing device. Based on the risk profile associated with the request, the computing platform may execute an isolation method to provide limited access to the uniform resource locator associated with the email message. In some instances, executing the isolation method may include initiating a browser mirroring session (Continued)

to provide the limited access to the potentially-malicious site.

20 Claims, 11 Drawing Sheets

Related U.S. Application Data

(60) Provisional application No. 62/863,991, filed on Jun. 20, 2019.

(51) Int. Cl.

| | |
|---|---|
| ***G06F 21/56*** | (2013.01) |
| ***G06F 21/62*** | (2013.01) |
| ***G06N 20/00*** | (2019.01) |
| ***H04L 9/40*** | (2022.01) |
| ***H04L 51/08*** | (2022.01) |
| ***H04L 51/212*** | (2022.01) |
| ***H04L 51/42*** | (2022.01) |

(52) U.S. Cl.

CPC ............ *H04L 51/08* (2013.01); *H04L 51/212* (2022.05); *H04L 51/42* (2022.05); *H04L 63/08* (2013.01); *H04L 63/10* (2013.01); *H04L 63/105* (2013.01); *H04L 63/1416* (2013.01); *H04L 63/1483* (2013.01); *G06F 2221/034* (2013.01)

(58) Field of Classification Search

CPC ........... G06F 21/577; G06F 2221/2119; G06N 20/00; H04L 51/08; H04L 51/212; H04L 51/42; H04L 63/08; H04L 63/10; H04L 63/105; H04L 63/1416; H04L 63/1483; H04L 63/102; H04L 63/0245; H04L 63/0281

See application file for complete search history.

(56) References Cited

U.S. PATENT DOCUMENTS

| | | | | |
|---|---|---|---|---|
| 8,776,168 | B1 | 7/2014 | Gibson et al. | |
| 9,239,908 | B1 | 1/2016 | Constantine | |
| 10,453,017 | B1 | 10/2019 | Richards et al. | |
| 10,601,865 | B1 * | 3/2020 | Mesdaq | H04L 63/1425 |
| 2007/0192855 | A1 | 8/2007 | Hulten et al. | |
| 2011/0167492 | A1 * | 7/2011 | Ghosh | H04L 63/1408 715/733 |
| 2014/0195604 | A1 | 7/2014 | Wyatt et al. | |
| 2016/0057167 | A1 | 2/2016 | Bach | |
| 2016/0308898 | A1 | 10/2016 | Teeple et al. | |
| 2017/0180413 | A1 * | 6/2017 | Petry | H04L 45/306 |
| 2018/0091453 | A1 * | 3/2018 | Jakobsson | H04L 63/1483 |

OTHER PUBLICATIONS

Feb. 18, 2022—(US) Non-Final Office Action—U.S. Appl. No. 16/875,216.

Mar. 1, 2022—(US) Non-Final Office Action—U.S. Appl. No. 16/875,118.

Jun. 6, 2022—(US) Notice of Allowance—U.S. Appl. No. 16/875,216.

Jul. 27, 2022—(US) Final Office Action—U.S. Appl. No. 16/875,118.

Dec. 6, 2022—(US) Non-Final Office Action—U.S. Appl. No. 16/875,118.

Jun. 23, 2023—(US) Final Office Action—U.S. Appl. No. 16/875,118.

Nov. 8, 2023—(US) Non-Final Office Action—U.S. Appl. No. 16/875,118.

Feb. 8, 2024—(US) Non-Final Office Action—U.S. Appl. No. 17/898,539.

May 29, 2024—(US) Notice of Allowance—U.S. Appl. No. 16/875,118.

Jan. 16, 2025—(US) Non-Final Office Action—U.S. Appl. No. 18/823,945.

* cited by examiner

DYNAMICALLY CONTROLLING ACCESS TO LINKED CONTENT IN ELECTRONIC COMMUNICATIONS

CROSS-REFERENCE TO RELATED APPLICATIONS

This application is a continuation of and claims priority to co-pending U.S. application Ser. No. 16/875,118, filed May 15, 2020, and entitled, "Dynamically Controlling Access to Linked Content in Electronic Communications," which claims the benefit of and priority to U.S. Provisional Patent Application Ser. No. 62/863,991, filed Jun. 20, 2019, and entitled "Integrating Targeted Attack Protection (TAP) and Isolation," both of which are incorporated by reference herein in their entirety.

TECHNICAL FIELD

Aspects of the disclosure relate to digital data processing systems, data processing methods, machine learning systems, and communication systems and networks. In particular, one or more aspects of the disclosure relate to dynamically controlling access to linked content in electronic communications.

BACKGROUND

Increasingly, users of computing devices and electronic communications services face various cybersecurity threats, including malicious phishing attempts and spam messages. While some tools have been developed to combat these threats, it remains difficult to provide enterprise users and other users with access to electronic information (which may, e.g., be remotely hosted and/or linked to in electronic communications sent to such users) in a manner that efficiently and effectively ensures the safety of each user, each user's personal information, and each user's computing device. These issues are further complicated when attempting to balance and optimize the consumption of the computing resources required to provide such protective features in an automated fashion while being constrained by the limitations imposed by finite processing power and limited network bandwidth.

SUMMARY

Aspects of the disclosure provide technical solutions that overcome one or more of the technical problems described above and/or other technical challenges. For instance, one or more aspects of the disclosure relate to dynamically controlling access to linked content in electronic communications.

In accordance with one or more embodiments, a computing platform having at least one processor, a communication interface, and memory may receive, via the communication interface, from a first user computing device, a first request for a first uniform resource locator associated with a first email message. Subsequently, the computing platform may identify that the first uniform resource locator associated with the first email message corresponds to a first potentially-malicious site. In response to identifying that the first uniform resource locator associated with the first email message corresponds to the first potentially-malicious site, the computing platform may determine a risk profile associated with the first request received from the first user computing device. Based on the risk profile associated with the first request received from the first user computing device, the computing platform may execute an isolation method to provide limited access to the first uniform resource locator associated with the first email message.

In some embodiments, the first uniform resource locator associated with the first email message may be an embedded link in the first email message that was rewritten by an email filtering engine hosted on the computing platform. In addition, identifying that the first uniform resource locator associated with the first email message corresponds to the first potentially-malicious site may include identifying that the first uniform resource locator associated with the first email message corresponds to the first potentially-malicious site using a URL defense (UD) tool hosted on the computing platform.

In some embodiments, determining the risk profile associated with the first request received from the first user computing device may include determining that the first uniform resource locator associated with the first email message is associated with a first web category.

In some embodiments, determining the risk profile associated with the first request received from the first user computing device may include determining one or more user-specific risk factors associated with a user of the first user computing device.

In some embodiments, determining the risk profile associated with the first request received from the first user computing device may include identifying that a user of the first user computing device is included in a very attacked persons group associated with an enterprise organization.

In some embodiments, executing the isolation method to provide limited access to the first uniform resource locator associated with the first email message may include initiating a browser mirroring session with the first user computing device to provide the first user computing device with limited access to the first potentially-malicious site corresponding to the first uniform resource locator associated with the first email message.

In some embodiments, executing the isolation method to provide limited access to the first uniform resource locator associated with the first email message may include preventing the first user computing device from downloading one or more binary objects.

In some embodiments, executing the isolation method to provide limited access to the first uniform resource locator associated with the first email message may include preventing the first user computing device from uploading one or more binary objects.

In some embodiments, executing the isolation method to provide limited access to the first uniform resource locator associated with the first email message may include controlling input to the first potentially-malicious site.

In some embodiments, executing the isolation method to provide limited access to the first uniform resource locator associated with the first email message may include providing data associated with the first potentially-malicious site to a phishing analysis service that is configured to return an indication of whether the first potentially-malicious site is a phishing site.

In some embodiments, executing the isolation method to provide limited access to the first uniform resource locator associated with the first email message may include providing a user-selectable option to break out of isolation after data associated with the first potentially-malicious site is analyzed.

In some embodiments, the computing platform may receive, via the communication interface, from a second user computing device, a second request for a second uniform resource locator associated with a second email message. Subsequently, the computing platform may identify that the second uniform resource locator associated with the second email message corresponds to a second potentially-malicious site. In response to identifying that the second uniform resource locator associated with the second email message corresponds to the second potentially-malicious site, the computing platform may determine a risk profile associated with the second request received from the second user computing device. Based on the risk profile associated with the second request received from the second user computing device, the computing platform may execute a second isolation method to provide limited access to the second uniform resource locator associated with the second email message.

In accordance with one or more additional or alternative embodiments, a computing platform having at least one processor, a communication interface, and memory may receive, via the communication interface, from a first user computing device, a first request for a first uniform resource locator associated with a first email message. Subsequently, the computing platform may evaluate the first request for the first uniform resource locator associated with the first email message using one or more isolation criteria. Based on evaluating the first request for the first uniform resource locator associated with the first email message using the one or more isolation criteria, the computing platform may identify that the first request meets at least one isolation condition associated with the one or more isolation criteria. In response to identifying that the first request meets the at least one isolation condition associated with the one or more isolation criteria, the computing platform may initiate a browser mirroring session with the first user computing device to provide the first user computing device with limited access to a first resource corresponding to the first uniform resource locator associated with the first email message.

In some embodiments, receiving the first request for the first uniform resource locator associated with the first email message may include receiving a request for an embedded link included in the first email message that was rewritten by an email filtering engine hosted on the computing platform to point to the computing platform instead of the first resource.

In some embodiments, evaluating the first request for the first uniform resource locator associated with the first email message using the one or more isolation criteria may include determining whether the first resource corresponding to the first uniform resource locator associated with the first email message is a file sharing site.

In some embodiments, evaluating the first request for the first uniform resource locator associated with the first email message using the one or more isolation criteria may include determining whether the first resource corresponding to the first uniform resource locator associated with the first email message is a potentially malicious site. In some instances, determining whether the first resource corresponding to the first uniform resource locator associated with the first email message is a potentially malicious site may include determining whether the first resource corresponding to the first uniform resource locator associated with the first email message is a potentially malicious site using a URL defense (UD) tool hosted on the computing platform.

In some embodiments, evaluating the first request for the first uniform resource locator associated with the first email message using the one or more isolation criteria may include determining whether the first resource corresponding to the first uniform resource locator associated with the first email message is a file having a predetermined file extension.

In some embodiments, identifying that the first request meets the at least one isolation condition associated with the one or more isolation criteria may include cross-referencing a data table identifying specific resources to be opened using browser mirroring.

In some embodiments, after initiating the browser mirroring session with the first user computing device to provide the first user computing device with limited access to the first resource corresponding to the first uniform resource locator associated with the first email message, the computing platform may scan the first resource using a live analysis service that is configured to analyze information received from the first resource while a user of the first user computing device is accessing the first resource and return an indication of whether the first resource is safe or malicious. In some instances, scanning the first resource using the live analysis service may include scanning user-authenticated content received from the first resource after the user of the first user computing device is authenticated by the first resource.

In some embodiments, the computing platform may receive, from the live analysis service, an indication that the first resource is safe. In response to receiving the indication that the first resource is safe from the live analysis service, the computing platform may provide a user-selectable option to break out of isolation.

In some embodiments, the computing platform may receive, from the live analysis service, an indication that the first resource is malicious. In response to receiving the indication that the first resource is malicious from the live analysis service, the computing platform may store data captured from the first resource. In some instances, in response to receiving the indication that the first resource is malicious from the live analysis service, the computing platform may provide the data captured from the first resource to a machine learning engine to train one or more machine learning models to recognize other malicious resources.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to dynamically controlling access to linked content in electronic communications. For example, in some arrangements, Targeted Attack Protection (TAP) technology may be integrated with isolation techniques. TAP technology may provide Attachment Defense (AD) and URL Defense (UD) functions, which may be used to block access to malicious attachments and URLs. By integrating TAP technology with isolation techniques, suspicious URLs may be opened in a sandboxed, isolated environment to provide limited access to linked pages and facilitate other monitoring and threat detection functions, as illustrated in greater detail below.

Figure 1A:
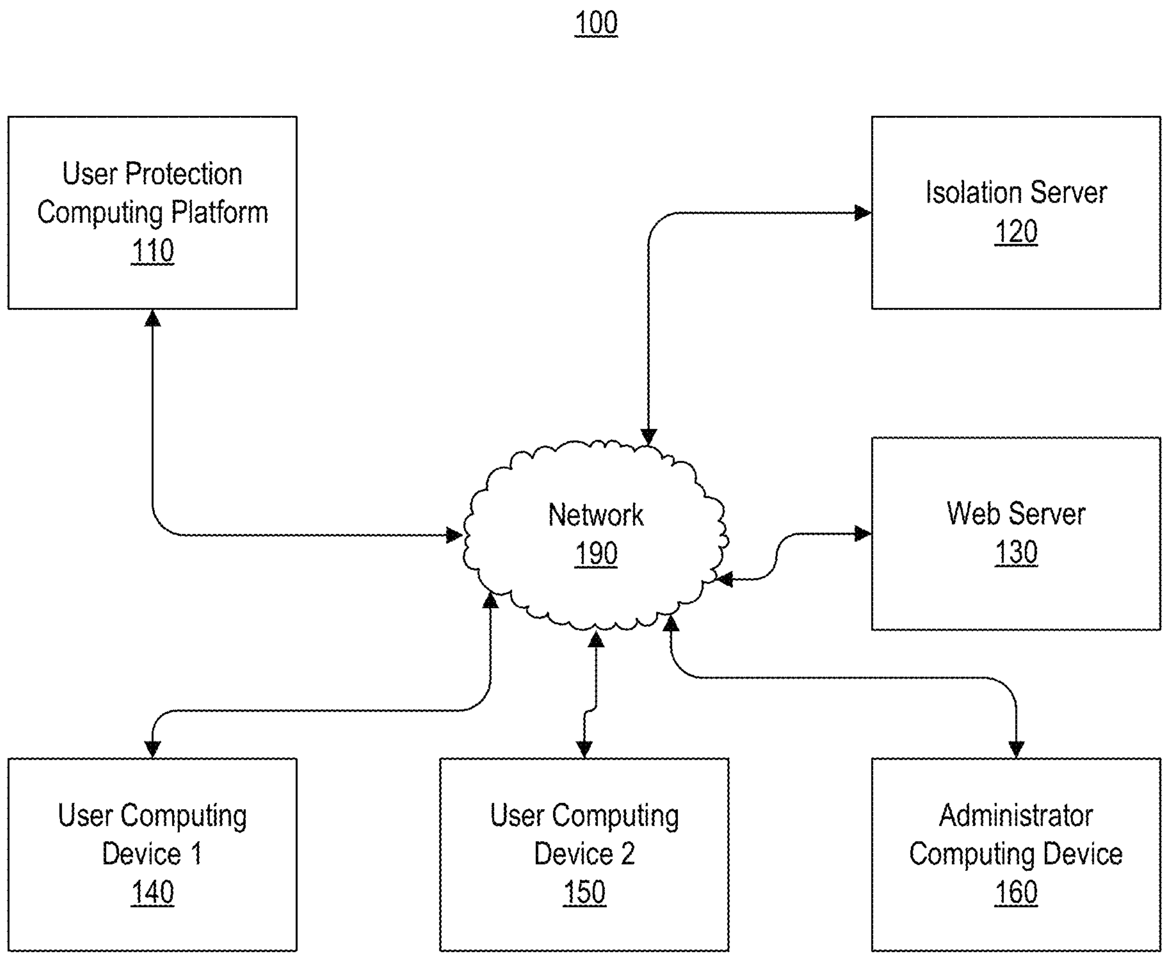
FIGS. 1A and 1B depict an illustrative operating environment for dynamically controlling access to linked content in electronic communications in accordance with one or more example embodiments.
Figure 1B:
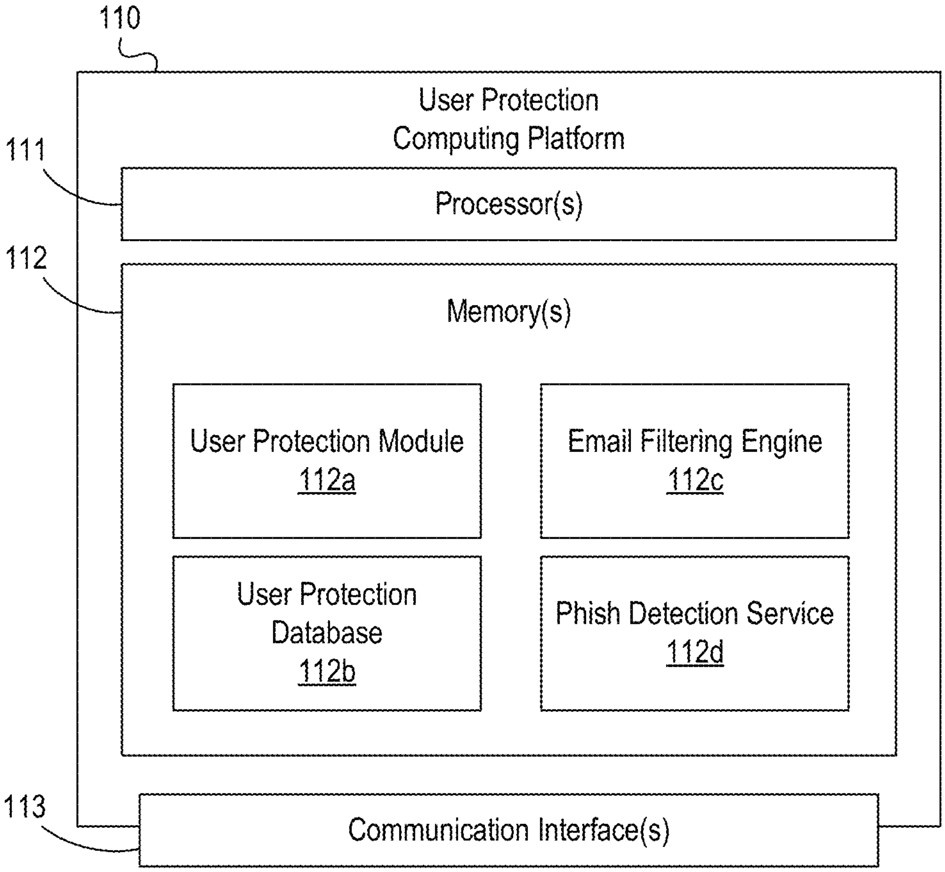

FIGS. 1A and 1B depict an illustrative operating environment for dynamically controlling access to linked content in electronic communications in accordance with one or more example embodiments. Referring to FIG. 1A, computing environment 100 may include various computer systems, computing devices, networks, and/or other operating infrastructure. For example, computing environment 100 may include a user protection computing platform 110, an isolation server 120, a web server 130, a first user computing device 140, a second user computing device 150, an administrator computing device 160, and a network 190.

Network 190 may include one or more wired networks and/or one or more wireless networks that interconnect user protection computing platform 110, isolation server 120, web server 130, user computing device 140, user computing device 150, administrator computing device 160, and/or other computer systems and/or devices. In addition, each of user protection computing platform 110, isolation server 120, web server 130, user computing device 140, user computing device 150, and administrator computing device 160 may be special purpose computing devices configured to perform specific functions, as illustrated in greater detail below, and may include specific computing components such as processors, memories, communication interfaces, and/or the like.

Isolation server 120 may be configured to host and/or otherwise provide one or more browser mirroring sessions. For instance, isolation server 120 may be configured to host a browser mirroring session in which a cloud browser is executed, so as to provide a user computing device (e.g., user computing device 140, user computing device 150) with limited access to an untrusted, remotely-hosted site via the cloud browser, as illustrated in greater detail below. In some instances, isolation server 120 may be operated by and/or otherwise associated with an enterprise organization, such as an organization operating user protection computing platform 110.

Web server 130 may be configured to host one or more websites. For instance, web server 130 may be configured to host one or more sites that may be accessed by isolation server 120 in providing one or more browser mirroring sessions, as illustrated in greater detail below. In some instances, web server 130 may be operated by and/or otherwise associated with a third-party organization, such as an organization different from the organization operating user protection computing platform 110 and/or isolation server 120.

User computing device 140 may be configured to be used by a first user (who may, e.g., be an enterprise user associated with an enterprise organization operating user protection computing platform 110). In some instances, user computing device 140 may be configured to present one or more user interfaces associated with a local browser, which may receive information from, send information to, and/or otherwise exchange information with isolation server 120 during a browser mirroring session.

User computing device 150 may be configured to be used by a second user (who may, e.g., be an enterprise user associated with an enterprise organization operating user protection computing platform 110 and who may be different from the first user of user computing device 140). In some instances, user computing device 150 may be configured to present one or more user interfaces associated with a local browser, which may receive information from, send information to, and/or otherwise exchange information with isolation server 120 during a browser mirroring session.

Administrator computing device 160 may be configured to be used by an administrative user (who may, e.g., be a network administrator of an enterprise organization operating user protection computing platform 110). Administrator computing device 160 may be configured to present one or more user interfaces associated with an administrative dashboard, receive and/or display one or more alerts, and/or otherwise facilitate monitoring and management of one or more systems and/or devices included in computing environment 100.

Referring to FIG. 1B, user protection computing platform 110 may include one or more processor(s) 111, one or more memory(s) 112, and one or more communication interface(s) 113. In some instances, user protection computing platform 110 may be made up of a plurality of different computing devices, which may be distributed within a single data center or a plurality of different data centers. In these instances, the one or more processor(s) 111, one or more memory(s) 112, and one or more communication interface(s) 113 included in user protection computing platform 110 may be part of and/or otherwise associated with the different computing devices that form user protection computing platform 110.

In one or more arrangements, processor(s) 111 may control operations of user protection computing platform 110. Memory(s) 112 may store instructions that, when executed by processor(s) 111, cause user protection computing platform 110 to perform one or more functions, as discussed below. Communication interface(s) 113 may include one or more wired and/or wireless network interfaces, and communication interface(s) 113 may connect user protection computing platform 110 to one or more networks (e.g., network 190) and/or enable user protection computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause user protection computing platform 110 to perform various functions), databases (which may, e.g., store data used by user protection computing platform 110 in performing various functions), and/or other elements (which may, e.g., include processing engines, services, and/or other elements). For example, memory(s) 112 may store and/or otherwise provide a user protection module 112*a*, a user protection database 112*b*, an email filtering engine 112*c*, and a phish detection service 112*d*. In some instances, user protection module 112*a* may store instructions that cause user protection computing platform 110 to dynamically control access to linked content in electronic communications and/or execute one or more other functions described herein. Additionally, user protection database 112*b* may store data that is used by user protection computing platform 110 in dynamically controlling access to linked content in electronic communications and/or executing one or more other functions described herein. Email filtering engine 112*c* may store instructions and/or data that cause user protection computing platform 110 to rewrite links in email messages processed by user protection computing platform 110 (e.g., such that links to remote sites embedded in such email messages are rewritten to point to user protection computing platform 110 for cybersecurity analysis before the sites corresponding to such links can be accessed by recipients of the email messages). Phish detection service 112*d* may store instructions and/or data that cause user protection computing platform 110 to execute various cybersecurity analysis processes on one or more remote sites, so as to identify and/or distinguish between legitimate sites and malicious sites (e.g., phishing sites, scam sites, and/or other potentially malicious sites). As illustrated below, phish detection service 112*d* may provide user protection computing platform 110 with a nearly real-time indication of whether a specific site is legitimate or malicious, and user protection computing platform 110 may limit and/or otherwise control a user computing device's access to the site based on the indication provided by phish detection service 112*d*.

Figure 2A:
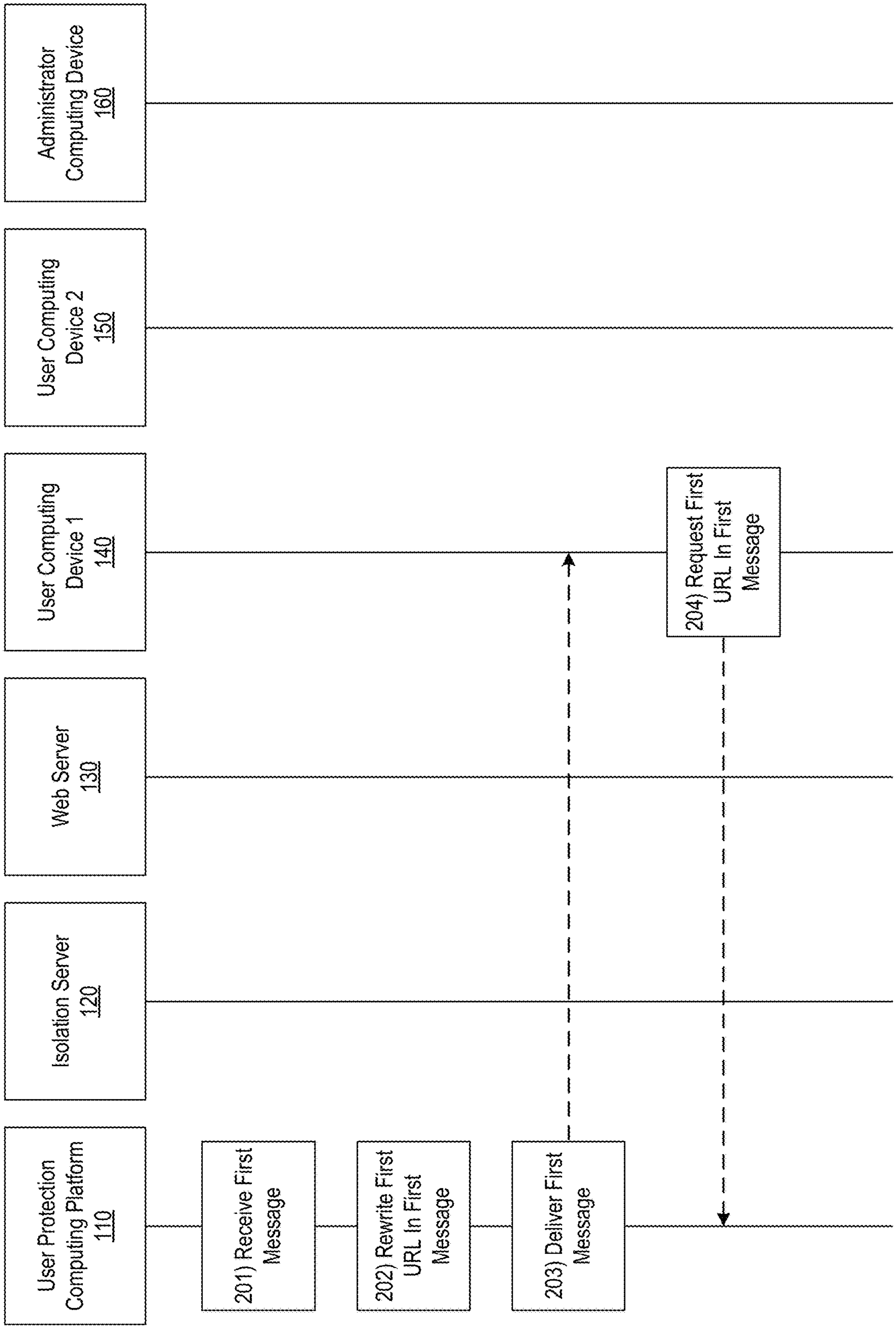
FIGS. 2A-2D depict an illustrative event sequence for dynamically controlling access to linked content in electronic communications in accordance with one or more example embodiments.

FIGS. 2A-2D depict an illustrative event sequence for dynamically controlling access to linked content in electronic communications in accordance with one or more example embodiments. Referring to FIG. 2A, at step 201, user protection computing platform 110 may receive a first message. For example, at step 201, user protection computing platform 110 may receive, from a remote messaging server and/or a remote source device, a first email message that includes one or more links to one or more remote sites.

At step 202, user protection computing platform 110 may rewrite a first uniform resource locator (URL) in the first message. For example, at step 202, user protection computing platform 110 may rewrite a link in the first email message, so that the original link (which may, e.g., point to a specific remote site) is replaced by an updated link (which may, e.g., point to user protection computing platform 110 and include a unique token corresponding to the original link). As a result, if the updated link is requested by a browser executing on the recipient device, the browser on the recipient device may exchange information with user protection computing platform 110, instead of the remote site, so as to protect the recipient device from potentially malicious content associated with the remote site, as illustrated in greater detail below.

At step 203, user protection computing platform 110 may deliver the first message to user computing device 140. For example, at step 203, user protection computing platform 110 may send the first message directly to user computing device 140 and/or may cause the first message to be sent to user computing device 140 via an email server or another messaging server.

At step 204, user computing device 140 may request the first URL included in the first message. For example, at step 204, after receiving and/or presenting the first message, user computing device 140 may receive input from the user of user computing device 140 requesting to open the first URL, and user computing device 140 accordingly may send a request for the first URL (which may, e.g., point to user protection computing platform 110, as discussed above) to user protection computing platform 110.

Figure 2B:
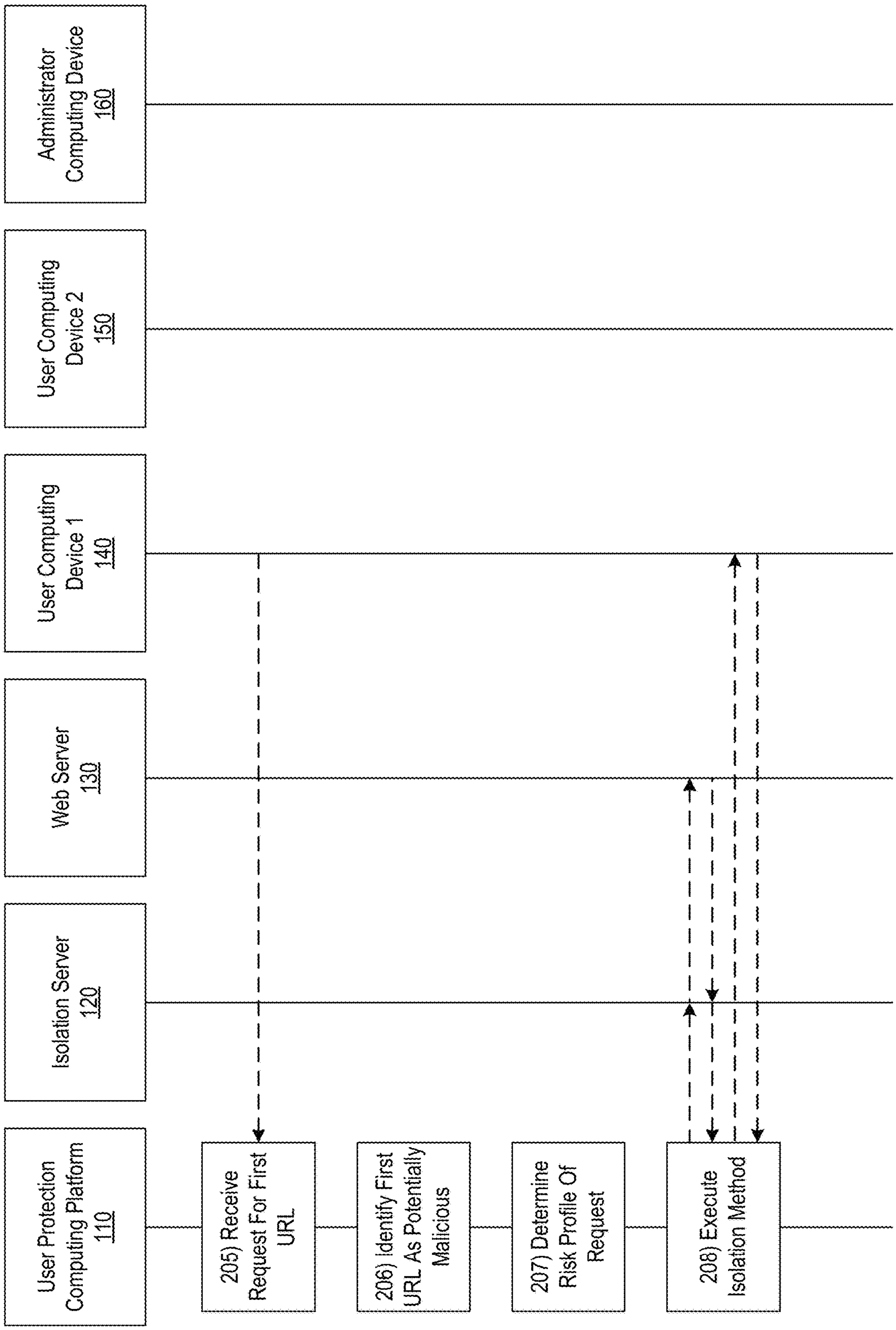
Figure 2C:
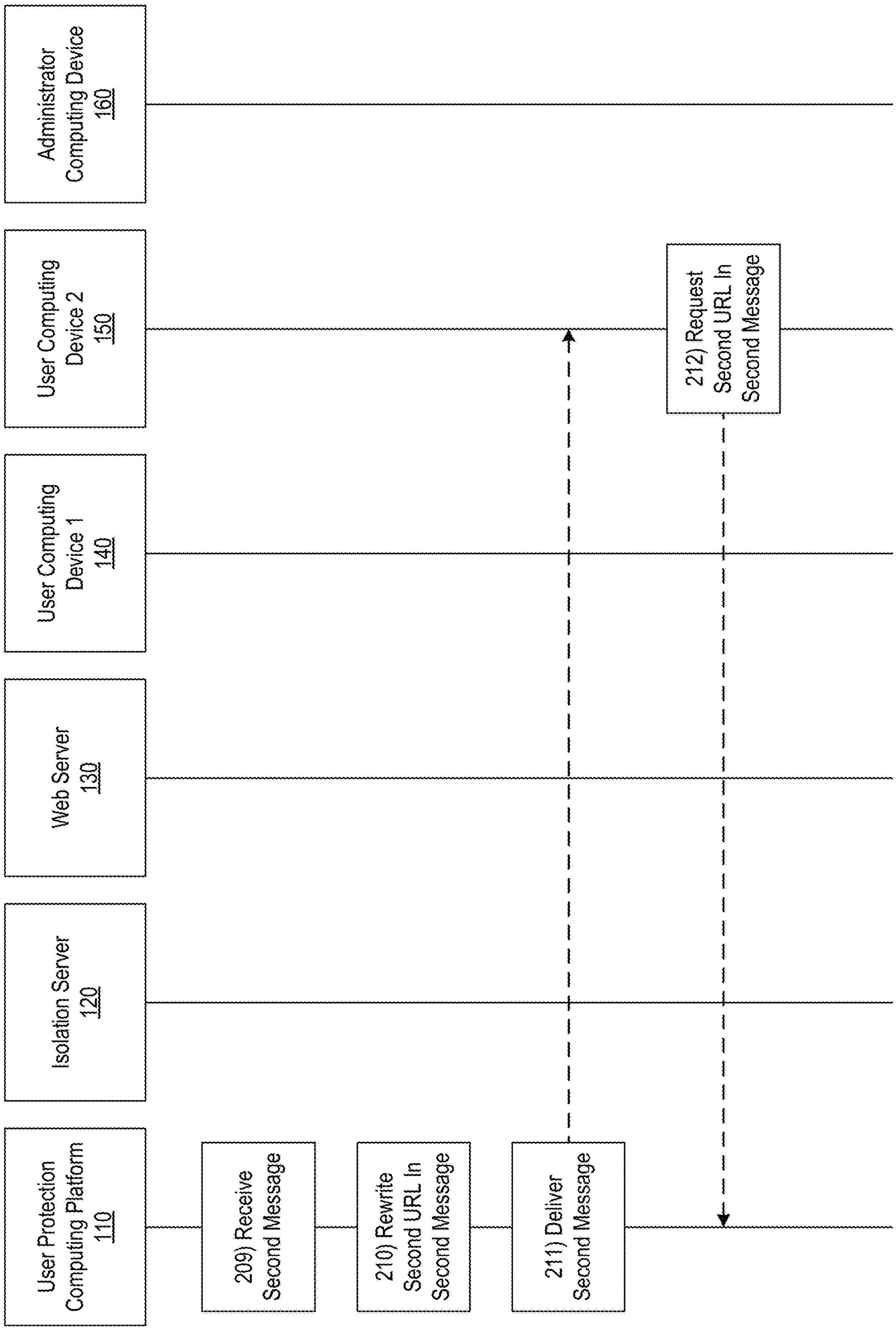

Referring to FIG. 2B, at step 205, user protection computing platform 110 may receive the request for the first URL from user computing device 140. For example, at step 205, user protection computing platform 110 may receive, via the communication interface (e.g., communication interface 113), from a first user computing device (e.g., user computing device 140), a first request for a first uniform resource locator associated with a first email message. For instance, the original URL in the email message may have been rewritten by an email filtering engine, such as email filtering engine 112*c*, and the updated URL in the email message (i.e., the first uniform resource locator associated with the first email message) may point to user protection computing platform 110, rather than the third-party site corresponding to the original URL.

At step 206, user protection computing platform 110 may identify that the first URL corresponds to a potentially malicious site. For example, at step 206, user protection computing platform 110 may identify that the first uniform resource locator associated with the first email message corresponds to a first potentially-malicious site (which may, e.g., be hosted by web server 130). This identification may, for instance, be performed by user protection computing platform 110 using one or more URL Defense (UD) functions provided by Targeted Attack Protection (TAP) technology. For example, user protection computing platform 110 may, in some instances, identify that the specific site is potentially malicious based on one or more rules that are defined on and/or maintained by user protection computing platform 110. For instance, a user of administrator computing device 160 may create and/or define one or more site safety rules, which may be stored on user protection computing platform 110 and/or applied by user protection computing platform 110 in executing a cybersecurity analysis process on the site. In some instances, new and/or modified rules may be received and/or applied by user protection computing platform 110 in real-time (e.g., as a rule is defined on administrator computing device 160, it may be pushed to user protection computing platform 110, which may trigger isolation and/or blocking of one or more specific sites). In some instances, different site safety rules (which may, e.g., be stored and/or applied by user protection computing platform 110) may be defined for different groups of users (e.g., based on different groups of users having different roles in an enterprise organization operating user protection computing platform 110). In one or more arrangements, by identifying that the first uniform resource locator associated with the first email message corresponds to a first potentially-malicious site, using one or more rules that are defined on and/or maintained by user protection computing platform 110 and/or received and/or applied by user protection computing platform 110 in real-time, user protection computing platform 110 may dynamically respond in real-time to new and/or changing threats (e.g., phishing sites, malware, data loss prevention threats, etc.) posed by various URLs, such as the first uniform resource locator associated with the first email message.

At step 207, user protection computing platform 110 may determine a risk profile of the request received from user computing device 140. For example, at step 207, in response to identifying that the first uniform resource locator associated with the first email message corresponds to the first potentially-malicious site, user protection computing platform 110 may determine a risk profile associated with the first request received from the first user computing device (e.g., user computing device 140). For instance, the risk profile may be determined by user protection computing platform 110 based on a web category and/or other features of the original URL, one or more risk factors associated with the user of user computing device 140, and/or other risk factors, as illustrated in greater detail below.

For example, user protection computing platform 110 may determine a web category (e.g., personal site, business site, banking site, porn site, gambling site, etc.) for the original URL and use this category in determining the risk profile. Additionally or alternatively, user protection computing platform 110 may determine one or more risk factors associated with the user of user computing device 140 and use these user-specific risk factors in determining the risk profile. For instance, user protection computing platform 110 may determine whether the user of user computing device 140 is a 'very attacked person' within an enterprise organization operating user protection computing platform 110 and/or otherwise a highly targeted user (e.g., based on an enterprise-specific index of users), and this determination may correspond to a particular user-specific risk factor that is used by user protection computing platform 110 in determining the risk profile, as discussed in greater detail below.

In addition, in determining the risk profile of the request at step 207, user protection computing platform 110 may use a set of predefined scores and thresholds to determine a level of risk associated with the request based on the categories and/or risk factors determined by user protection computing platform 110. For example, each web category and/or risk factor may correspond to a different predetermined score value. After identifying the specific web categories and/or risk factors associated with the request received from user computing device 140, user protection computing platform 110 may identify the score values corresponding to these web categories and/or risk factors. User protection computing platform 110 then may sum these score values to determine an overall score for the request and may compare the overall score with one or more predetermined thresholds. For example, if the overall score exceeds a medium risk threshold but not a high risk threshold, user protection computing platform 110 may determine the risk profile of the request to be 'medium' risk. If the overall score exceeds both the medium risk threshold and the high risk threshold, user protection computing platform 110 may determine the risk profile of the request to be 'high' risk. If the overall score does not exceed the medium risk threshold or the high risk threshold, user protection computing platform 110 may determine the risk profile of the request to be 'low' risk. If, for instance, the risk profile of the request is determined by user protection computing platform 110 to be 'low,' user protection computing platform 110 may allow the site to be opened by user computing device 140 normally (e.g., without executing an isolation method). Alternatively, if the risk profile of the request is determined by user protection computing platform 110 to be 'medium' or 'high,' user protection computing platform 110 may continue to step 208 to execute one or more isolation methods, as illustrated below.

In some embodiments, the first uniform resource locator associated with the first email message may be an embedded link in the first email message that was rewritten by an email filtering engine hosted on the computing platform. In addition, identifying that the first uniform resource locator associated with the first email message corresponds to the first potentially-malicious site may include identifying that the first uniform resource locator associated with the first email message corresponds to the first potentially-malicious site using a URL defense (UD) tool hosted on the computing platform. For example, the first uniform resource locator associated with the first email message may be an embedded link in the first email message that was rewritten by an email filtering engine (e.g., email filtering engine 112*c*) hosted on user protection computing platform 110. In addition, in identifying that the first uniform resource locator associated with the first email message corresponds to the first potentially-malicious site at step 206, user protection computing platform 110 may identify that the first uniform resource locator associated with the first email message corresponds to the first potentially-malicious site using a URL defense (UD) tool executed by and/or otherwise hosted on user protection computing platform 110. For instance, user protection computing platform 110 may identify that the first uniform resource locator associated with the first email message corresponds to the first potentially-malicious site using URL defense (UD) functions provided by Targeted Attack Protection (TAP) technology executed by and/or otherwise hosted on the computing platform (e.g., user protection computing platform 110).

In some embodiments, determining the risk profile associated with the first request received from the first user computing device may include determining that the first uniform resource locator associated with the first email message is associated with a first web category. For example, in determining the risk profile associated with the first request received from the first user computing device (e.g., user computing device 140) at step 207, user protection computing platform 110 may determine that the first uniform resource locator associated with the first email message is associated with a first web category. For instance, user protection computing platform 110 may determine that the first uniform resource locator associated with the first email message is associated with a first specific web category (e.g., personal site, business site, banking site, porn site, gambling site, etc.), as discussed above. In some instances, user protection computing platform 110 may determine that the first uniform resource locator associated with the first email message is associated with a specific category by matching site contents from the first uniform resource locator with information defined in one or more category templates maintained by user protection computing platform 110, such as a template for identifying personal sites, a template for identifying business sites, a template for identifying banking sites, a template for identifying porn sites, a template for identifying gambling sites, and so on.

In some embodiments, determining the risk profile associated with the first request received from the first user computing device may include determining one or more user-specific risk factors associated with a user of the first user computing device. For example, in determining the risk profile associated with the first request received from the first user computing device (e.g., user computing device 140) at step 207, user protection computing platform 110 may determine one or more user-specific risk factors associated with a user of the first user computing device (e.g., user computing device 140), as discussed above. In some instances, user protection computing platform 110 may determine that the first uniform resource locator associated with the first email message is associated with a particular user-specific risk factor by matching user information associated with the user of user computing device 140 with information defined in one or more user risk templates maintained by user protection computing platform 110.

For example, user protection computing platform 110 may maintain and/or access information defining a group of 'very attacked persons' (who may, e.g., be enterprise users who are members of and/or otherwise associated with an enterprise organization operating user protection computing platform 110) for whom many or all links are to be opened using an isolation method. In some instances, user protection computing platform 110 may dynamically score various enterprise users, so as to dynamically add and/or remove specific users to and/or from the group of very attacked persons (e.g., instead of using a static list of very attacked persons) and/or otherwise update the group. In this way, user protection computing platform 110 may regularly and/or periodically reevaluate whether each user in the group of very attacked persons continues to qualify as a very attacked person and/or should continue to be included in the group (which may, e.g., be subject to having links be opened using an isolation method). In some instances, user protection computing platform 110 may identify a particular user as a very attacked person based on calculating a user-specific risk score for the user and determining that the user-specific risk score exceeds a predetermined threshold. As noted above, in some instances, a user who is classified as a high-risk user and/or who is a member of a very attacked persons group may be subject to having all of their links (e.g., all of the links that are embedded in and/or otherwise included in all of their incoming messages) being opened in isolation by user protection computing platform 110.

In some embodiments, determining the risk profile associated with the first request received from the first user computing device may include evaluating various factors associated with the first request received from the first user computing device. For example, in determining the risk profile associated with the first request received from the first user computing device (e.g., user computing device 140) at step 207, user protection computing platform 110 may identify that the user of user computing device 140 is attempting to access a site that is uncategorized (e.g., a site that is uncategorized by a URL defense service running on and/or accessible to user protection computing platform 110). Based on identifying that the user of user computing device 140 is attempting to access a site that is uncategorized, user protection computing platform 110 may determine to open the site using an isolation method (e.g., so as to selectively limit and/or otherwise control access to the site by the user of user computing device 140).

Additionally or alternatively, in determining the risk profile associated with the first request received from the first user computing device (e.g., user computing device 140) at step 207, user protection computing platform 110 may analyze and/or score the URL string of the URL corresponding to the site that the user of user computing device 140 is attempting to access. For instance, user protection computing platform 110 may analyze the text and/or character pattern of the URL string to predict whether the corresponding page is potentially malicious or likely legitimate (e.g., by calculating a risk score based on the text and/or character pattern of the URL string and evaluating whether the risk score exceeds a predetermined threshold). If user protection computing platform 110 predicts that the corresponding page is potentially malicious, user protection computing platform 110 may determine to open the site using an isolation method (e.g., so as to selectively limit and/or otherwise control access to the site by the user of user computing device 140). Alternatively, if user protection computing platform 110 predicts that the corresponding page is likely legitimate, user protection computing platform 110 may determine to allow user computing device 140 to open the site in a normal manner.

Additionally or alternatively, in determining the risk profile associated with the first request received from the first user computing device (e.g., user computing device 140) at step 207, user protection computing platform 110 may analyze one or more headers and/or other header content of a page corresponding to the first uniform resource locator associated with the first email message. For instance, user protection computing platform 110 may analyze such headers and/or header content to determine whether the page is potentially malicious or likely legitimate (e.g., by comparing such headers and/or header content to predefined templates and/or records identifying headers and/or header content associated with pages that have been labeled as malicious and/or legitimate).

Additionally or alternatively, in determining the risk profile associated with the first request received from the first user computing device (e.g., user computing device 140) at step 207, user protection computing platform 110 may identify and/or analyze location information identifying the location of user computing device 140 and/or the user of user computing device 140. For instance, user protection computing platform 110 may identify and/or analyze location information identifying an origination point (which may, e.g., be expressed in geographic coordinates) of the first request received from user computing device 140. For example, if the location of user computing device 140 and/or the user of user computing device 140 has changed significantly within a predetermined amount of time (e.g., two hours ago the user of user computing device 140 was determined to be in Chicago and now the user of user computing device 140 is determined to be in Malaysia), user protection computing platform 110 may determine to increase the risk profile associated with the first request received from user computing device 140 (e.g., by increasing a risk score associated with the first request by a predetermined amount).

Additionally or alternatively, in determining the risk profile associated with the first request received from the first user computing device (e.g., user computing device 140) at step 207, user protection computing platform 110 may analyze data received from one or more sensors embedded in one or more enterprise networks. For instance, user protection computing platform 110 may analyze enterprise-wide traffic and/or other data received from such sensors to determine if malicious traffic is entering or leaving one or more enterprise networks. If user protection computing platform 110 determines that malicious traffic is entering or leaving one or more enterprise networks based on this analysis, user protection computing platform 110 may determine to increase the risk profile associated with the first request received from user computing device 140 (e.g., by increasing a risk score associated with the first request by a predetermined amount).

In some embodiments, determining the risk profile associated with the first request received from the first user computing device may include identifying that a user of the first user computing device is included in a very attacked persons group associated with an enterprise organization. For example, in determining the risk profile associated with the first request received from the first user computing device (e.g., user computing device 140) at step 207, user protection computing platform 110 may identify that a user of the first user computing device (e.g., user computing device 140) is included in a very attacked persons group associated with the enterprise organization operating user protection computing platform 110. For instance, user protection computing platform 110 may maintain, access, and/or update information defining a group of 'very attacked persons' (who may, e.g., be enterprise users who are members of and/or otherwise associated with an enterprise organization operating user protection computing platform 110), as discussed above. In some instances, the users included in the group of very attacked persons may be users who have relatively more seniority within the organization than other users (e.g., managers, executives, etc.), users who have relatively more authority within the organization than other users (e.g., financial officers, accountants, lawyers, etc.), and/or users who are targeted more frequently by malicious actors than other users. In addition, if the user of user computing device 140 is included in this group, user protection computing platform 110 may determine to increase the risk profile associated with the first request received from user computing device 140 (e.g., by increasing a risk score associated with the first request by a predetermined amount). In some instances, this increase may result in user protection computing platform 110 determining to open the site corresponding to the first uniform resource locator associated with the first email message using an isolation method (e.g., so as to selectively limit and/or otherwise control access to the site by the user of user computing device 140), as discussed in greater detail below.

At step 208, user protection computing platform 110 may execute an isolation method (e.g., based on determining the risk profile of the request at step 207). For example, at step 208, based on the risk profile associated with the first request received from the first user computing device (e.g., user computing device 140), user protection computing platform 110 may execute an isolation method to provide limited access to the first uniform resource locator associated with the first email message. For instance, in executing the isolation method, user protection computing platform 110 may control and/or cause isolation server 120 to access web server 130 and provide user computing device 140 with limited access to a site hosted by web server 130, as described in greater detail below.

In some embodiments, executing the isolation method to provide limited access to the first uniform resource locator associated with the first email message may include initiating a browser mirroring session with the first user computing device to provide the first user computing device with limited access to the first potentially-malicious site corresponding to the first uniform resource locator associated with the first email message. For example, in executing the isolation method to provide limited access to the first uniform resource locator associated with the first email message at step 208, user protection computing platform 110 may initiate a browser mirroring session with the first user computing device (e.g., user computing device 140) to provide the first user computing device (e.g., user computing device 140) with limited access to the first potentially-malicious site corresponding to the first uniform resource locator associated with the first email message.

For instance, in executing the isolation method at step 208, user protection computing platform 110 may use browser mirroring in which the site corresponding to the first uniform resource locator associated with the first email message is opened on a cloud browser executing on isolation server 120, while safe content is mirrored on the user's local browser executing on user computing device 140 (e.g., by mirroring the document object model loaded on the cloud browser at the local browser). This browser mirroring approach may be different from a remote desktop approach, as browser mirroring might not involve using an image or graphical representation of the cloud browser on isolation server 120 or other virtualization methods. Rather, user protection computing platform 110 may send static hypertext markup language (HTML) content, trusted Javascript content, and/or other static/trusted web content to the user's local browser on user computing device 140 for local execution on user computing device 140, based on the cloud browser on isolation server 120 executing the HTML, third-party Javascript, dynamic code, and/or other third-party content that is received from the original URL and/or web server 130.

For example, after determining that the risk profile associated with the request is relatively high (e.g., above a predefined threshold risk level or dynamic threshold risk level) and/or otherwise determining that an isolation method should be used in providing limited access to a site, user protection computing platform 110 may spin up and/or otherwise instantiate a cloud browser that executes in a cloud service on isolation server 120 when a user of user computing device 140 attempts to visit the requested site. The cloud browser on isolation server 120 may fetch the original URL from web server 130, and the dynamic code that is received from web server 130 may execute on the cloud service on isolation server 120. Each document object model (DOM) element in the HTML content rendered at the cloud browser on isolation server 120 may be tagged, and this HTML content may be synchronized with the local browser on user computing device 140 (e.g., so as to facilitate and implement DOM mirroring). In this way, only static HTML content and trusted Javascript (e.g., not third-party Javascript) may run on the local browser on user computing device 140. In addition, an open socket may be maintained (e.g., between isolation server 120, user computing device 140, and/or user protection computing platform 110) so as to provide feedback from the local browser on user computing device 140 to the cloud browser on isolation server 120, for instance, to report mouse input events (e.g., mouse hover events, selections, etc.), keyboard input events, and/or other input events from user computing device 140 back to the cloud browser on isolation server 120. Furthermore, any malicious code associated with the third-party site may run on the cloud browser on isolation server 120 while being completely isolated from the end user and their local browser on user computing device 140. In addition, if a phish or other malicious code is detected at the cloud browser on isolation server 120, user protection computing platform 110 may prevent the phish or other malicious code from being replicated at the local browser on user computing device 140.

In some instances, in executing the isolation method at step 208, user protection computing platform 110 may allow an analyst user or network administrator (e.g., a user of administrator computing device 160) to inspect the content being received by isolation server 120 from the site hosted by web server 130 in real-time (e.g., contemporaneously as such content is being received by isolation server 120).

Additionally or alternatively, user protection computing platform 110 may store a time-indexed record of data received by isolation server 120 from the site hosted by web server 130 as the user of user computing device 140 browses and/or otherwise interacts with the site. The time-indexed record (which may, e.g., be maintained by user protection computing platform 110) may enable an analyst user or network administrator (e.g., a user of administrator computing device 160) to inspect the user's complete browsing experience and/or clickstream with the site. In some instances, user protection computing platform 110 may provide and/or integrate with an administrative dashboard portal so as to provide administrator computing device 160 and/or other devices (which may, e.g., be used by analyst users and/or network administrators) with access to site inspection functions, time-indexed records, and/or other information associated with sites opened using an isolation method. For instance, via such a portal, user protection computing platform 110 may host and/or provide (e.g., to administrator computing device 160) information identifying how specific users interacted with specific sites, information identifying specific sites that have been identified as phishing sites, information identifying specific sites that have been identified as legitimate sites, and/or other information.

Figure 3:
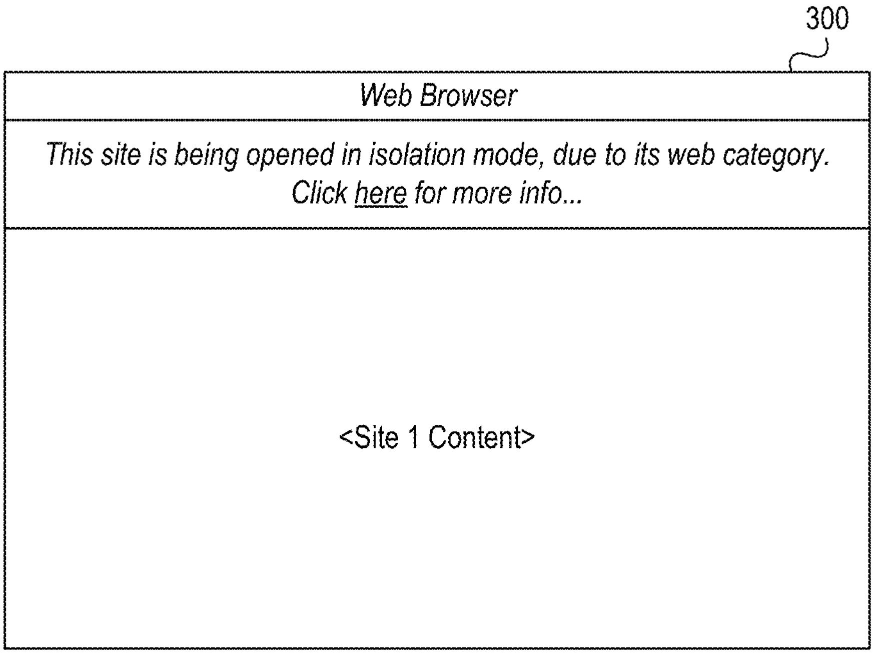
FIGS. 3-8 depict illustrative user interfaces for dynamically controlling access to linked content in electronic communications in accordance with one or more example embodiments.

In some instances, in executing the isolation method at step 208, user protection computing platform 110 may cause user computing device 140 to generate, display, and/or otherwise present one or more graphical user interfaces (which may, e.g., indicate that user protection computing platform 110 is providing only limited access to the first uniform resource locator associated with the first email message). For example, in executing the isolation method at step 208, user protection computing platform 110 may cause user computing device 140 to generate, display, and/or otherwise present a graphical user interface similar to graphical user interface 300, which is illustrated in FIG. 3. As seen in FIG. 3, graphical user interface 300 may include a notification indicating that an isolation method is being executed because of a requested site's web category (e.g., "This site is being opened in isolation mode, due to its web category. Click here for more info . . . ") as well as static content which corresponds to the site and which is received from isolation server 120 in connection with a browser mirroring session established between user computing device 140 and isolation server 120.

Figure 4:
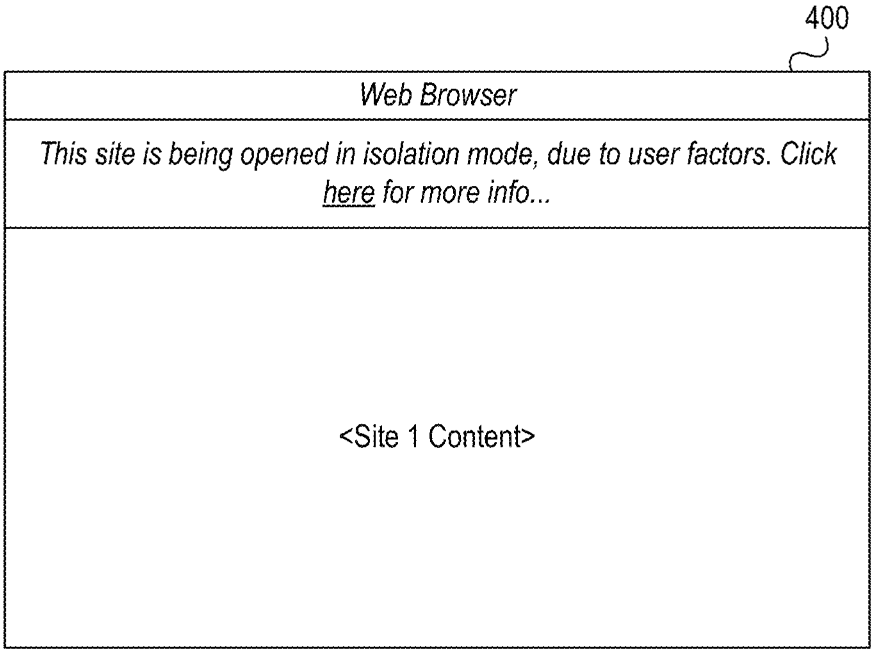
Figure 5:
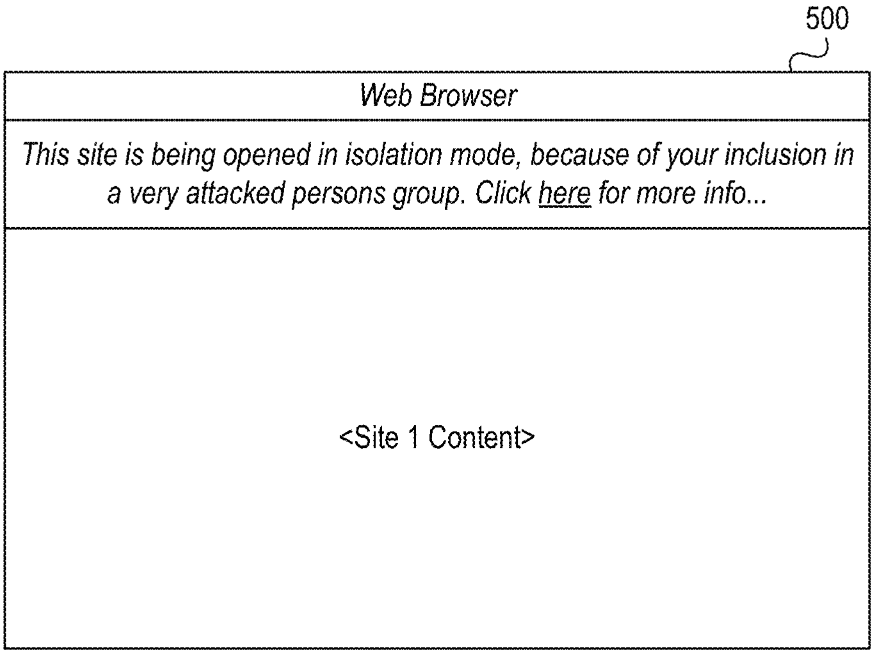

As another example, in executing the isolation method at step 208, user protection computing platform 110 may cause user computing device 140 to generate, display, and/or otherwise present a graphical user interface similar to graphical user interface 400, which is illustrated in FIG. 4. As seen in FIG. 4, graphical user interface 400 may include a notification indicating that an isolation method is being executed because of one or more user-specific risk factors (e.g., "This site is being opened in isolation mode, due to user factors. Click here for more info . . . ") as well as static content which corresponds to the site and which is received from isolation server 120 in connection with a browser mirroring session established between user computing device 140 and isolation server 120. As another example, in executing the isolation method at step 208, user protection computing platform 110 may cause user computing device 140 to generate, display, and/or otherwise present a graphical user interface similar to graphical user interface 500, which is illustrated in FIG. 5. As seen in FIG. 5, graphical user interface 500 may include a notification indicating that an isolation method is being executed because of the user of user computing device 140 being included in a 'very attacked persons' group (e.g., "This site is being opened in isolation mode, because of your inclusion in a very attacked persons group. Click here for more info . . . ") as well as static content which corresponds to the site and which is received from isolation server 120 in connection with a browser mirroring session established between user computing device 140 and isolation server 120.

In some embodiments, executing the isolation method to provide limited access to the first uniform resource locator associated with the first email message may include preventing the first user computing device from downloading one or more binary objects. For example, in executing the isolation method to provide limited access to the first uniform resource locator associated with the first email message at step 208, user protection computing platform 110 may prevent the first user computing device (e.g., user computing device 140) from downloading one or more binary objects. For instance, user protection computing platform 110 may allow user computing device 140 to download image files but may prevent user computing device 140 from downloading other, non-image binary objects from the first potentially-malicious site corresponding to the first uniform resource locator associated with the first email message. For example, the cloud browser on isolation server 120 may intercept any attempts by user computing device 140 to download binary objects and either block such event(s) or substitute a re-rendering of the binary object as an HTML page, PDF file, text document, or the like.

In some embodiments, executing the isolation method to provide limited access to the first uniform resource locator associated with the first email message may include preventing the first user computing device from uploading one or more binary objects. For example, in executing the isolation method to provide limited access to the first uniform resource locator associated with the first email message at step 208, user protection computing platform 110 may prevent the first user computing device (e.g., user computing device 140) from uploading one or more binary objects. For instance, user protection computing platform 110 may allow user computing device 140 to upload image files but may prevent user computing device 140 from uploading other, non-image binary objects to the first potentially-malicious site corresponding to the first uniform resource locator associated with the first email message. For example, the cloud browser on isolation server 120 may intercept any attempts by user computing device 140 to upload binary objects and may block such event(s) and/or notify the user of user computing device 140 of the disallowed behavior.

In some embodiments, executing the isolation method to provide limited access to the first uniform resource locator associated with the first email message may include controlling input to the first potentially-malicious site. For example, in executing the isolation method to provide limited access to the first uniform resource locator associated with the first email message at step 208, user protection computing platform 110 may control input to the first potentially-malicious site. For instance, user protection computing platform 110 may filter and/or otherwise control keyboard input, mouse input, and/or other input received from the user of the first user computing device (e.g., user computing device 140) so as to prevent the user of user computing device 140 from providing personal information to the potentially malicious site. For example, if server-side analysis of the page indicates that the page is likely a phishing site, the user of user computing device 140 might still be allowed by user protection computing platform 110 to browse the site, but the user of user computing device 140 might be prevented from providing any keyboard input to the site (e.g., so the user cannot enter credentials or other private information). In some instances, the local browser on user computing device 140 may display fake input (e.g., so the user of user computing device 140 might believe that they are entering content into the page) as the user is attempting to provide input to the site, but the local browser on user computing device 140 may protect the user of user computing device 140 by not posting any keyboard input to the page executing on the cloud browser on isolation server 120.

Figure 6:
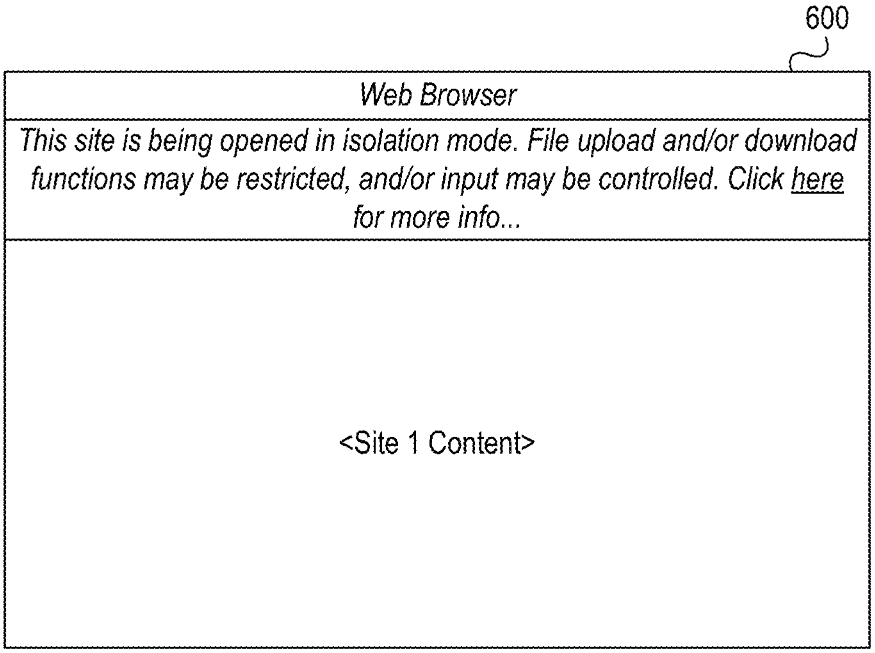

In some instances (e.g., in which upload and/or download features are limited and/or where input is controlled), user protection computing platform 110 may cause user computing device 140 to generate, display, and/or otherwise present a graphical user interface similar to graphical user interface 600, which is illustrated in FIG. 6, when executing the isolation method at step 208. As seen in FIG. 6, graphical user interface 600 may include a notification indicating that an isolation method is being executed and that specific functionality has been limited (e.g., "This site is being opened in isolation mode. File upload and/or download functions may be restricted, and/or input may be controlled. Click here for more info . . . ") as well as static content which corresponds to the site and which is received from isolation server 120 in connection with a browser mirroring session established between user computing device 140 and isolation server 120.

In some embodiments, executing the isolation method to provide limited access to the first uniform resource locator associated with the first email message may include providing data associated with the first potentially-malicious site to a phishing analysis service that is configured to return an indication of whether the first potentially-malicious site is a phishing site. For example, in executing the isolation method to provide limited access to the first uniform resource locator associated with the first email message at step 208, user protection computing platform 110 may send and/or otherwise provide data associated with the first potentially-malicious site to a phishing analysis service (e.g., phish detection service 112*d*) that is configured to return an indication of whether the first potentially-malicious site is a phishing site. For instance, in performing live phish detection, the HTML/DOM contents of the page that is being rendered at the cloud browser on isolation server 120 may be sent and/or otherwise provided by isolation server 120 and/or user protection computing platform 110 to phish detection service 112*d* on user protection computing platform 110, and phish detection service 112*d* may use one or more machine-learning models to make a real-time determination as to whether the page is a phishing site. In this way, the site being analyzed by phish detection service 112*d* may be run in a live environment on isolation server 120 and the output of the site may be provided by isolation server 120 and/or user protection computing platform 110 to the one or more machine-learning models and/or systems that enable and/or host phish detection service 112*d*. This approach may provide technical benefits and other advantages, because some sophisticated malicious websites might not detonate or otherwise reveal their malicious content when executed under certain conditions that are typically associated with monitoring and classification servers (e.g., when running at certain network addresses, when running on a virtual machine, etc.) so as to fool monitoring and classification algorithms. Advantageously, by running the site in a live environment on isolation server 120 and monitoring its output, user protection computing platform 110 may circumvent various factors that a malicious site may use to hide its true nature.

In some instances, user protection computing platform 110 and/or phish detection service 112*d* may perform a live phish detection process while executing the isolation method at step 208. This live phish detection process (which may, e.g., be performed by user protection computing platform 110) may include scanning payload information received by isolation server 120 from web server 130 while site content is being rendered (and while preventing the user of user computing device 140 from providing credentials, sensitive information, or other input to the site). If user protection computing platform 110 determines, based on this scanning, that the site is a phishing site, user protection computing platform 110 may block user computing device 140 and/or other user devices associated with the enterprise organization operating user protection computing platform 110 from accessing the site entirely. Alternatively, if user protection computing platform 110 determines, based on the scanning, that the site is a legitimate site, user protection computing platform 110 may allow the user of user computing device 140 to break out of isolation (e.g., so as to have a normal browsing experience in which web server 130 directly serves page(s) to user computing device 140 without isolation), as discussed in greater detail below. In some instances, user protection computing platform 110 may select and/or use different models in evaluating the site's DOM based on the content or type of site being evaluated. In addition, because isolation server 120 may be rendering (and user protection computing platform 110 and/or phish detection service 112*d* may be scoring) the actual content that is intended for the user of user computing device 140, including the site's DOM and the user's clickstream and other interactions, user protection computing platform 110 and/or phish detection service 112*d* may be able to analyze user-authenticated content. The ability to analyze this user-authenticated content may provide one or more technical advantages over conventional sandboxing approaches in which only non-authenticated content may be retrieved and/or analyzed by a monitoring and classification server.

Figure 7:
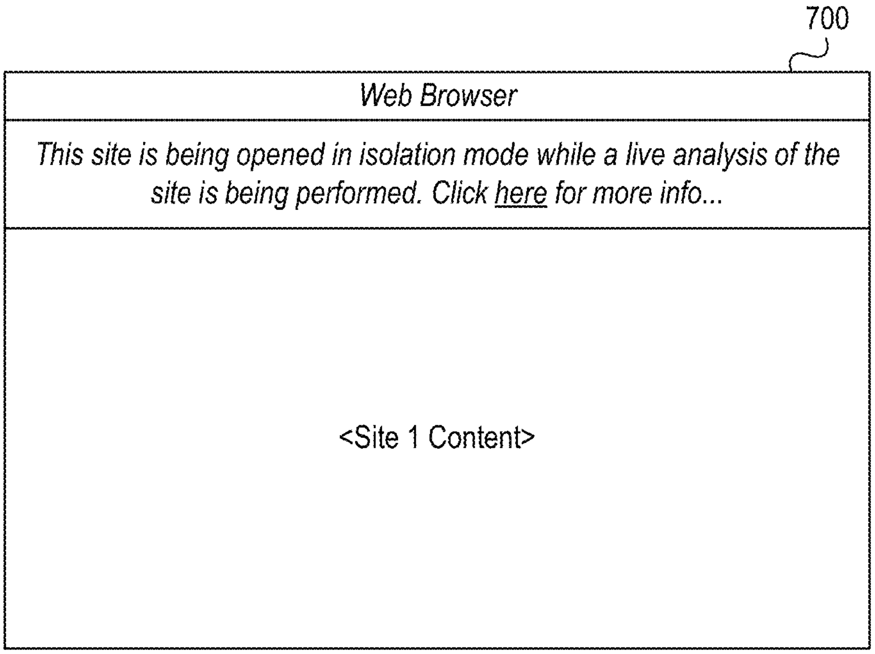

In some instances (e.g., in which live phish detection is performed), user protection computing platform 110 may cause user computing device 140 to generate, display, and/or otherwise present a graphical user interface similar to graphical user interface 700, which is illustrated in FIG. 7, when executing the isolation method at step 208. As seen in FIG. 7, graphical user interface 700 may include a notification indicating that an isolation method is being executed and that a live phish detection process is performed (e.g., "This site is being opened in isolation mode while a live analysis of the site is being performed. Click here for more info . . . ") as well as static content which corresponds to the site and which is received from isolation server 120 in connection with a browser mirroring session established between user computing device 140 and isolation server 120.

In some embodiments, executing the isolation method to provide limited access to the first uniform resource locator associated with the first email message may include providing a user-selectable option to break out of isolation after data associated with the first potentially-malicious site is analyzed. For example, in executing the isolation method to provide limited access to the first uniform resource locator associated with the first email message at step 208, user protection computing platform 110 may provide a user-selectable option to break out of isolation after data associated with the first potentially-malicious site is analyzed. For instance, user protection computing platform 110 may provide a user-selectable option to break out of isolation after data associated with the first potentially-malicious site is analyzed during a live phish analysis process (e.g., as described above) and the requested site is confirmed to be legitimate. In this way, if the user of user computing device 140 wishes to break out of isolation (e.g., to upload or download files to the page that has been opened in isolation on the cloud browser on isolation server 120 and/or to otherwise locally open the page on a local browser on user computing device 140), the user of user computing device 140 may be required to wait for a machine-learning-based sandbox analysis of the page to be completed (e.g., via the live phish analysis process performed by phish detection service 112*d* and/or user protection computing platform 110, as described above) before isolation can be broken. Advantageously, user protection computing platform 110 may still allow the user of user computing device 140 to browse the page and/or other pages associated with the site while this analysis is happening (e.g., instead of providing the user with a placeholder page).

Figure 8:
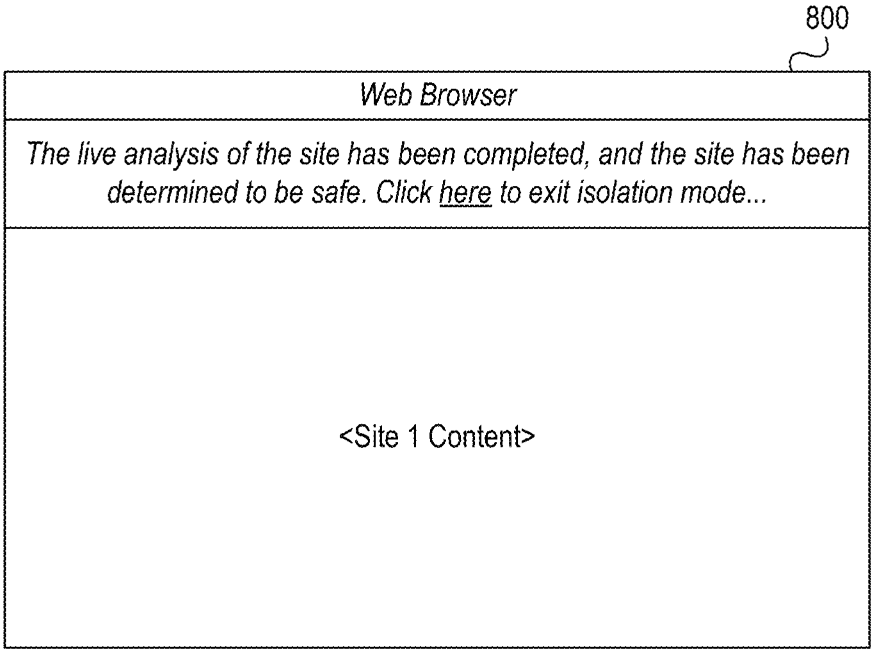

In some instances (e.g., in which a user-selectable option to break out of isolation is provided after data associated with the first potentially-malicious site is analyzed), user protection computing platform 110 may cause user computing device 140 to generate, display, and/or otherwise present a graphical user interface similar to graphical user interface 800, which is illustrated in FIG. 8, when executing the isolation method at step 208. As seen in FIG. 8, graphical user interface 800 may include a notification indicating that a live phish analysis process has been completed and that isolation mode may be exited (e.g., "The live analysis of the site has been completed, and the site has been determined to be safe. Click here to exit isolation mode . . . ") as well as static content which corresponds to the site and which is received from isolation server 120 in connection with a browser mirroring session established between user computing device 140 and isolation server 120. After the user of user computing device 140 selects the option to break out of isolation mode, user computing device 140 may access and/or otherwise locally open the site (which may, e.g., involve user computing device 140 directly exchanging data with web server 130 so as to receive source code from the site, locally execute dynamic code associated with the site on user computing device 140, and/or locally render other content associated with the site on user computing device 140).

Subsequently, user protection computing platform 110 may perform one or more additional steps, similar to those described above, as requests for additional sites are received from the same and/or other user computing devices. For example, referring to FIG. 2C, at step 209, user protection computing platform 110 may receive a second message. For example, at step 209, user protection computing platform 110 may receive, from a remote messaging server and/or a remote source device, a second email message that includes one or more links to one or more remote sites.

At step 210, user protection computing platform 110 may rewrite a second uniform resource locator (URL) in the second message. For example, at step 210, user protection computing platform 110 may rewrite a link in the second email message, so that the original link (which may, e.g., point to a specific remote site) is replaced by an updated link (which may, e.g., point to user protection computing platform 110 and include a unique token corresponding to the original link). As a result, if the updated link is requested by a browser executing on the recipient device, the browser on the recipient device may exchange information with user protection computing platform 110, instead of the remote site, so as to protect the recipient device from potentially malicious content associated with the remote site.

At step 211, user protection computing platform 110 may deliver the second message to user computing device 150. For example, at step 211, user protection computing platform 110 may send the second message directly to user computing device 150 and/or may cause the second message to be sent to user computing device 150 via an email server or another messaging server.

At step 212, user computing device 150 may request the second URL included in the second message. For example, at step 212, after receiving and/or presenting the second message, user computing device 150 may receive input from the user of user computing device 150 requesting to open the second URL, and user computing device 150 accordingly may send a request for the second URL (which may, e.g., point to user protection computing platform 110, as discussed above) to user protection computing platform 110.

Figure 2D:
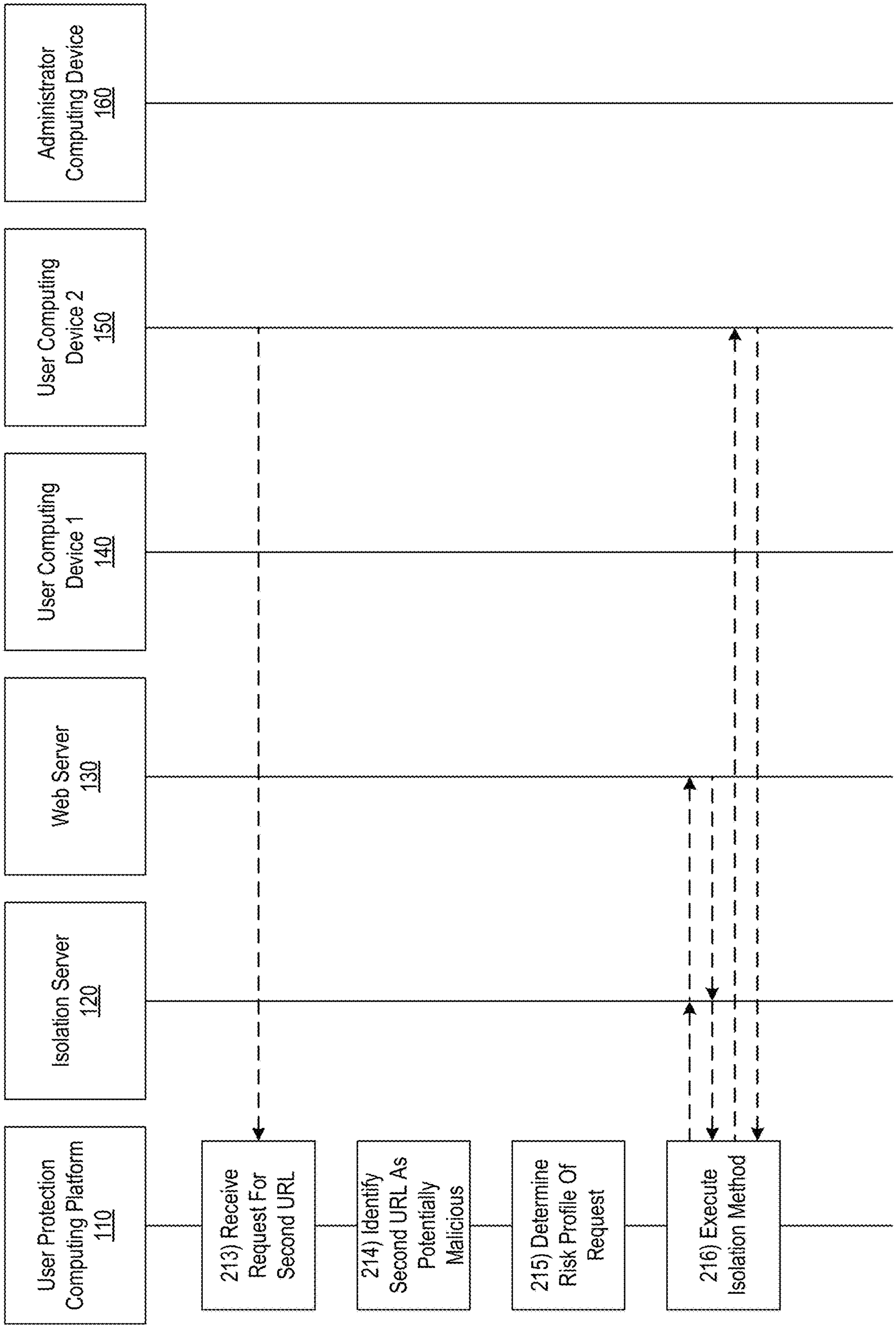

Referring to FIG. 2D, at step 213, user protection computing platform 110 may receive the request for the second URL from user computing device 150. For example, at step 213, user protection computing platform 110 may receive, via the communication interface (e.g., communication interface 113), from a second user computing device (e.g., user computing device 150), a second request for a second uniform resource locator associated with a second email message. For instance, the original URL in the email message may have been rewritten by an email filtering engine, such as email filtering engine 112*c*, and the updated URL in the email message (i.e., the second uniform resource locator associated with the second email message) may point to user protection computing platform 110, rather than the third-party site corresponding to the original URL.

At step 214, user protection computing platform 110 may identify that the second URL corresponds to a potentially malicious site. For example, at step 214, user protection computing platform 110 may identify that the second uniform resource locator associated with the second email message corresponds to a second potentially-malicious site (which may, e.g., be hosted by web server 130). This identification may, for instance, be performed by user protection computing platform 110 using one or more URL Defense (UD) functions provided by Targeted Attack Protection (TAP) technology, similar to how user protection computing platform 110 may identify that the first uniform resource locator associated with the first email message corresponds to the first potentially-malicious site in the examples discussed above.

At step 215, user protection computing platform 110 may determine a risk profile of the request received from user computing device 150. For example, at step 215, in response to identifying that the second uniform resource locator associated with the second email message corresponds to the second potentially-malicious site, user protection computing platform 110 may determine a risk profile associated with the second request received from the second user computing device (e.g., user computing device 150). For instance, the risk profile may be determined by user protection computing platform 110 based on a web category and/or other features of the original URL, one or more risk factors associated with the user of user computing device 150, and/or other risk factors, similar to how user protection computing platform 110 may determine a risk profile of the request received from user computing device 140 in the examples discussed above.

At step 216, user protection computing platform 110 may execute an isolation method (e.g., based on determining the risk profile of the request at step 215). For example, at step 216, based on the risk profile associated with the second request received from the second user computing device (e.g., user computing device 150), user protection computing platform 110 may execute a second isolation method to provide limited access to the second uniform resource locator associated with the second email message. For instance, in executing the isolation method, user protection computing platform 110 may control and/or cause isolation server 120 to access web server 130 and provide user computing device 150 with limited access to a site hosted by web server 130 and/or may perform one or more other steps, similar to how user protection computing platform 110 may execute an isolation method to provide limited access to the first uniform resource locator associated with the first email message in the examples discussed above.

Subsequently, user protection computing platform 110 may continue to receive and process requests for URLs from the same and/or other user computing devices. In processing each of these requests, user protection computing platform 110 may similarly identify whether the URL associated with the request is malicious, determine a risk profile of the request, and execute an isolation method based on the risk profile of the request, as in the examples discussed above. In some instances, user protection computing platform 110 may apply similar isolation methods to URLs pointing to files (e.g., rather than webpages). In these instances, user protection computing platform 110 may open the linked file using an isolation method and provide a requesting user computing device with limited access to the linked file, and user protection computing platform 110 may scan the file to determine whether it is safe or includes malicious content, as in the examples discussed above.

Additionally or alternatively, user protection computing platform 110 may implement these isolation-based file-scanning methods to protect enterprise data and/or provide enterprise data loss prevention (DLP) functions. For instance, user protection computing platform 110 may open a linked file using an isolation method and may scan the file to determine whether the file contains data that is not allowed to be sent and/or shared outside of an enterprise organization because of one or more enterprise data loss prevention policies. In these instances, if user protection computing platform 110 determines that the linked file does not contain data that is subject to a DLP policy, user protection computing platform 110 may allow the user of a user computing device (e.g., user computing device 140, user computing device 150) who has requested the file to break out of isolation and/or otherwise fully access the file (e.g., after user protection computing platform 110 initially opened the file using an isolation method and scanned the file for compliance with the DLP policy). Alternatively, if user protection computing platform 110 determines that the linked file does contain data that is subject to a DLP policy, user protection computing platform 110 may deny the user of the user computing device further access to the file, end any browser mirroring session that has been initiated, generate and send one or more alerts (e.g., to administrator computing device 160), and/or perform other actions (which may, e.g., be specified by the DLP policy).

As noted above, user protection computing platform 110 may, in some instances, select and/or use different models in evaluating a site's DOM based on the content or type of site being evaluated. In addition, because isolation server 120 may be rendering (and user protection computing platform 110 and/or phish detection service 112*d* may be scoring) the actual content that is intended for the user of user computing device 140, including the site's DOM and the user's click-stream and other interactions, user protection computing platform 110 and/or phish detection service 112*d* may be able to analyze user-authenticated content. The ability to analyze this user-authenticated content may provide one or more technical advantages over conventional sandboxing approaches in which only non-authenticated content may be retrieved and/or analyzed by a monitoring and classification server. Moreover, user protection computing platform 110 may, in some instances, apply one or more rules that were trained and/or learned by user protection computing platform 110 in isolated, user-authenticated sessions and apply those rules in non-isolated and/or non-authenticated sessions. For instance, user protection computing platform 110 may apply one or more machine-learned rules for identifying phishing and/or malware that were trained and/or otherwise determined by user protection computing platform 110 based on analyzing user-authenticated content in one or more isolated, user-authenticated sessions when monitoring site content, user interaction data, and/or other data in one or more non-authenticated sessions.

For instance, user protection computing platform 110 may apply one or more machine-learned rules for identifying phishing and/or malware that were trained and/or otherwise determined by user protection computing platform 110 based on analyzing user-authenticated content in one or more isolated, user-authenticated sessions when monitoring a user's use of and/or interactions with a file sharing site. File sharing sites may, for example, be commonly targeted by malicious users, and user protection computing platform 110 may be configured to open links to file sharing sites in isolation by default and/or may be configured to monitor data received from file sharing sites and/or other interactions with file sharing sites (e.g., data received from and/or sent to a file sharing site by an enterprise user of a user computing device, such as user computing device 140 or user computing device 150) even when such sites are not opened in isolation. Additional examples of how user protection computing platform 110 may open links to file sharing sites in isolation are discussed in greater detail below.

In some instances, when opening a link in isolation and/or otherwise executing an isolation method, user protection computing platform 110 may utilize one or more caching optimization rules. Such caching optimization rules may, for instance, define different caching policies for different members of different enterprise user groups. For examples, users who are members of a senior management user group within an enterprise organization may be allocated greater cache resources by user protection computing platform 110 than other users when user protection computing platform 110 is opening links in isolation and/or otherwise executing isolation methods (e.g., with respect to requests received from such users). Advantageously, such caching optimization rules may, for selected user groups, reduce delay and/or other impact on end-user experience that might otherwise be caused by user protection computing platform 110 opening links in isolation and/or otherwise executing isolation methods (e.g., due to the use of additional processing resources and/or network bandwidth that may be required by user protection computing platform 110 when opening links in isolation and/or otherwise executing isolation methods). In this way, such caching optimization rules may increase the overall effectiveness of user protection computing platform 110 when opening links in isolation and/or otherwise executing isolation methods, so as to protect information security, data integrity, and enterprise computing resources.

Figure 9:
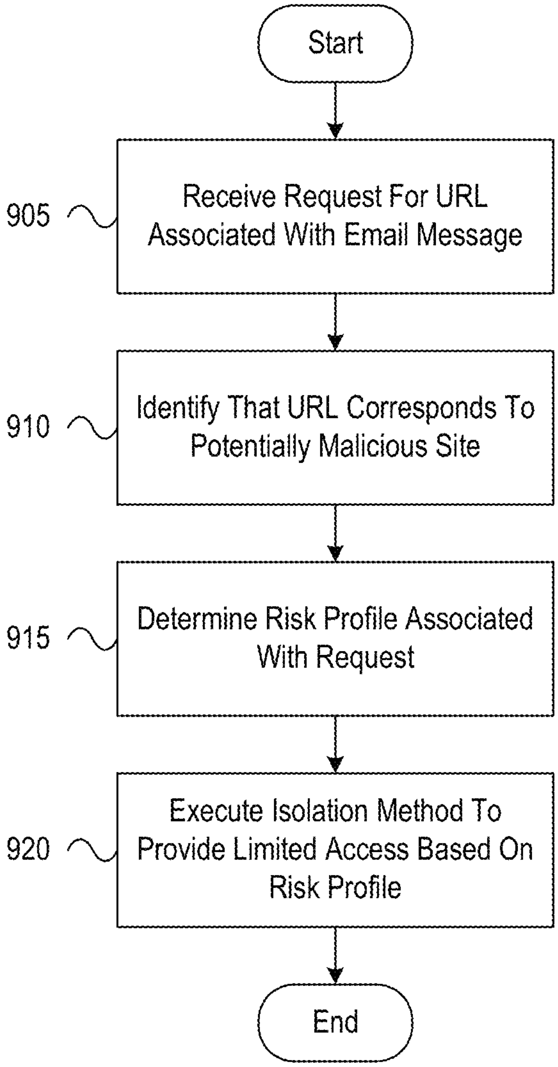
FIG. 9 depicts an illustrative method for dynamically controlling access to linked content in electronic communications in accordance with one or more example embodiments.

FIG. 9 depicts an illustrative method for dynamically controlling access to linked content in electronic communications in accordance with one or more example embodiments. Referring to FIG. 9, at step 905, a computing platform having at least one processor, a communication interface, and memory may receive, via the communication interface, from a first user computing device, a first request for a first uniform resource locator associated with a first email message. At step 910, the computing platform may identify that the first uniform resource locator associated with the first email message corresponds to a first potentially-malicious site. At step 915, in response to identifying that the first uniform resource locator associated with the first email message corresponds to the first potentially-malicious site, the computing platform may determine a risk profile associated with the first request received from the first user computing device. At step 920, based on the risk profile associated with the first request received from the first user computing device, the computing platform may execute an isolation method to provide limited access to the first uniform resource locator associated with the first email message.

Figure 10:
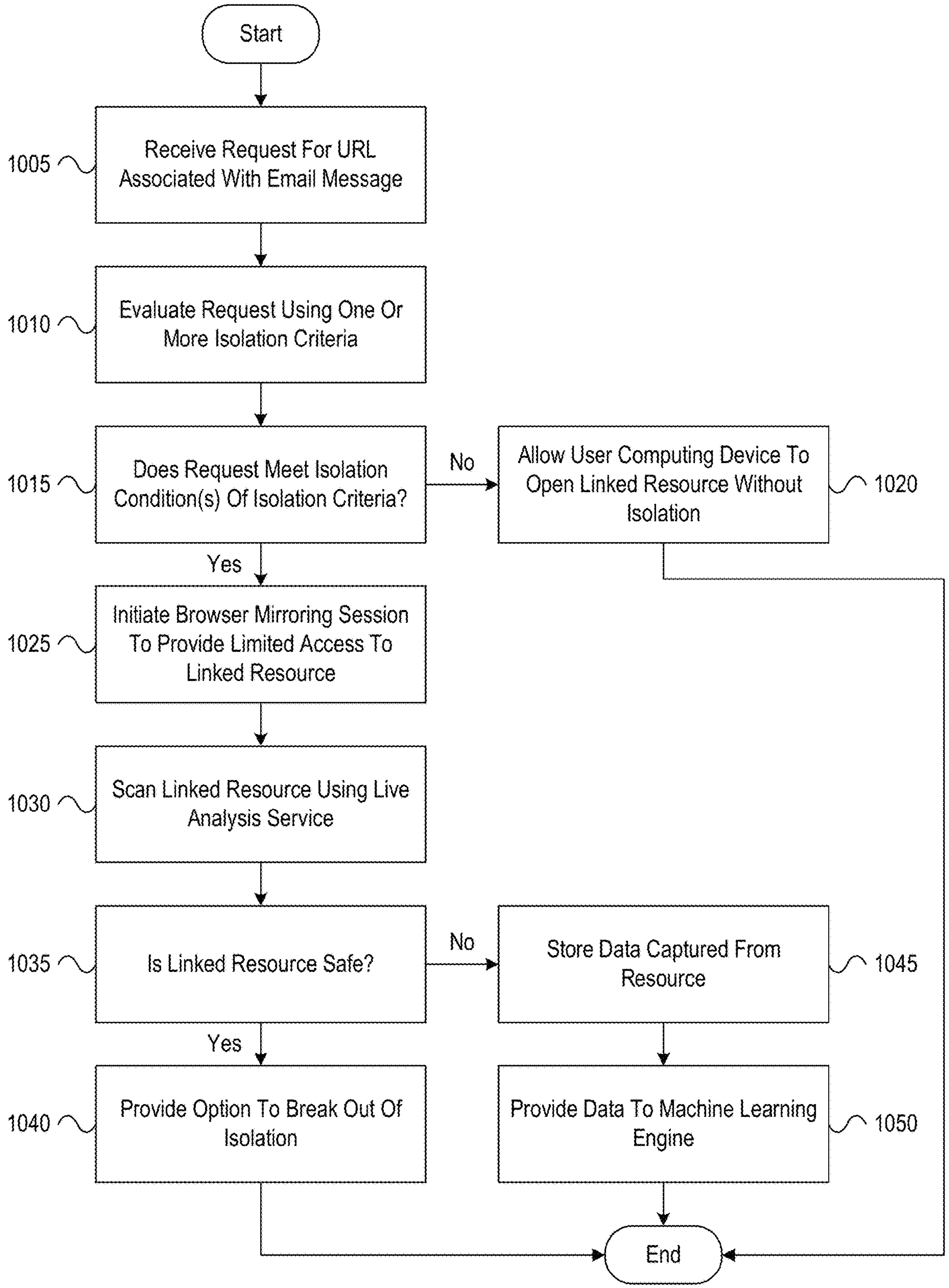
FIG. 10 depicts another illustrative method for dynamically controlling access to linked content in electronic communications in accordance with one or more example embodiments.

FIG. 10 depicts another illustrative method for dynamically controlling access to linked content in electronic communications in accordance with one or more example embodiments. Referring to FIG. 10, at step 1005, a computing platform having at least one processor, a communication interface, and memory may receive, via the communication interface, from a first user computing device, a first request for a first uniform resource locator associated with a first email message. For example, at step 1005, user protection computing platform 110 may receive, via communication interface 113, from user computing device 140, a first request for a first uniform resource locator associated with a first email message. For instance, user protection computing platform 110 may receive a request for a URL from user computing device 140 similar to how user protection computing platform 110 may receive such a request in the examples discussed above.

In some embodiments, receiving the first request for the first uniform resource locator associated with the first email message may include receiving a request for an embedded link included in the first email message that was rewritten by an email filtering engine hosted on the computing platform to point to the computing platform instead of the first resource. For example, in receiving the first request for the first uniform resource locator associated with the first email message at step 1005, user protection computing platform 110 may receive a request for an embedded link included in the first email message that was rewritten by an email filtering engine (e.g., email filtering engine 112*c*) hosted on the computing platform (e.g., user protection computing platform 110) to point to the computing platform (e.g., user protection computing platform 110) instead of the first resource. For instance, user protection computing platform 110 may have rewritten a link in the first email message, so that the original link (which may, e.g., point to a specific remote site) was replaced by an updated link (which may, e.g., point to user protection computing platform 110 and include a unique token corresponding to the original link), as in the examples discussed above.

At step 1010, the computing platform may evaluate the first request for the first uniform resource locator associated with the first email message using one or more isolation criteria. For example, at step 1010, user protection computing platform 110 may evaluate the first request for the first uniform resource locator associated with the first email message using one or more isolation criteria. For instance, user protection computing platform 110 may store and/or maintain one or more isolation criteria that may specify features of a request and/or other conditions that, if present and/or met, indicate and/or warrant that a particular request should be opened using an isolation method (e.g., using browser mirroring). The one or more isolation criteria may, for instance, be defined by a cybersecurity analyst and/or network administrator (e.g., a user of administrator computing device 160). Additionally or alternatively, the one or more isolation criteria may be automatically determined by user protection computing platform 110, for instance, by training a classification model and/or other machine-learning algorithm on a labeled dataset that includes examples of legitimate resources, phishing sites, malware, malicious content, and/or other data. In these instances, user protection computing platform 110 may generate and store such a classification model and/or other machine-learning algorithm prior to receiving the first request for the first uniform resource locator associated with the first email message, and user protection computing platform 110 may apply the classification model and/or other machine-learning algorithm to the first request for the first uniform resource locator associated with the first email message in evaluating the first request at step 1010.

In some embodiments, evaluating the first request for the first uniform resource locator associated with the first email message using the one or more isolation criteria may include determining whether the first resource corresponding to the first uniform resource locator associated with the first email message is a file sharing site. For example, in evaluating the first request for the first uniform resource locator associated with the first email message using the one or more isolation criteria at step 1010, user protection computing platform 110 may determine whether the first resource corresponding to the first uniform resource locator associated with the first email message is a file sharing site (e.g., a cloud-hosted website that allows users to upload files to be stored on one or more cloud servers, download files to be accessed locally, and/or share files with other users). For instance, user protection computing platform 110 may determine whether the first resource corresponding to the first uniform resource locator associated with the first email message is a file sharing site because user protection computing platform 110 may store and/or maintain one or more isolation criteria that specify that links to file sharing sites should always be opened in isolation or should be opened in isolation when other specific conditions are met (e.g., based on whether the request is originating from within or outside of an enterprise network, based on whether the user requesting the link is a member of a very attacked persons group, based on the current time of day, based on the current geographic location of the requesting user computing device, and/or based on other factors).

In some embodiments, evaluating the first request for the first uniform resource locator associated with the first email message using the one or more isolation criteria may include determining whether the first resource corresponding to the first uniform resource locator associated with the first email message is a potentially malicious site. For example, in evaluating the first request for the first uniform resource locator associated with the first email message using the one or more isolation criteria at step 1010, user protection computing platform 110 may determine whether the first resource corresponding to the first uniform resource locator associated with the first email message is a potentially malicious site. For instance, user protection computing platform 110 may determine whether the first resource corresponding to the first uniform resource locator associated with the first email message is a potentially malicious site because user protection computing platform 110 may store and/or maintain one or more isolation criteria that specify that links to potentially malicious sites should always be opened in isolation or should be opened in isolation when other specific conditions are met (e.g., as in the examples discussed above).

In some embodiments, determining whether the first resource corresponding to the first uniform resource locator associated with the first email message is a potentially malicious site may include determining whether the first resource corresponding to the first uniform resource locator associated with the first email message is a potentially malicious site using a URL defense (UD) tool hosted on the computing platform. For instance, in determining whether the first resource corresponding to the first uniform resource locator associated with the first email message is a potentially malicious site at step 1010, user protection computing platform 110 may determine whether the first resource corresponding to the first uniform resource locator associated with the first email message is a potentially malicious site using one or more URL Defense (UD) functions provided by Targeted Attack Protection (TAP) technology hosted on user protection computing platform 110, as in the examples discussed above.

In some embodiments, evaluating the first request for the first uniform resource locator associated with the first email message using the one or more isolation criteria may include determining whether the first resource corresponding to the first uniform resource locator associated with the first email message is a file having a predetermined file extension. For example, in evaluating the first request for the first uniform resource locator associated with the first email message using the one or more isolation criteria at step 1010, user protection computing platform 110 may determine whether the first resource corresponding to the first uniform resource locator associated with the first email message is a file having a predetermined file extension. For instance, user protection computing platform 110 may determine whether the first resource corresponding to the first uniform resource locator associated with the first email message is a file having a predetermined file extension because user protection computing platform 110 may store and/or maintain one or more isolation criteria which specify that links to specific types of files (e.g., files having certain, predetermined extensions, such as EXE, DOCM, JS, JAR, PY, BAT, or the like) should always be opened in isolation or should be opened in isolation when other specific conditions are met (e.g., based on whether the request is originating from within or outside of an enterprise network, based on whether the user requesting the link is a member of a very attacked persons group, based on the current time of day, based on the current geographic location of the requesting user computing device, and/or based on other factors).

At step 1015, the computing platform may determine whether the first request meets one or more isolation conditions associated with the one or more isolation criteria. For example, at step 1015, user protection computing platform 110 may determine whether the first request meets one or more isolation conditions associated with the one or more isolation criteria based on the evaluating performed at step 1010.

If the computing platform determines that the first request does not meet the one or more isolation conditions associated with the one or more isolation criteria, then at step 1020, the computing platform may allow the first user computing device to open the resource corresponding to the first uniform resource locator associated with the first email message (e.g., without initiating browser mirroring and/or otherwise executing an isolation method). For example, if user protection computing platform 110 determines that the first request does not meet the one or more isolation conditions associated with the one or more isolation criteria, then at step 1020, user protection computing platform 110 may allow user computing device 140 to open the resource corresponding to the first uniform resource locator associated with the first email message (e.g., without initiating browser mirroring and/or otherwise executing an isolation method). In allowing user computing device 140 to open the resource corresponding to the first uniform resource locator associated with the first email message, user protection computing platform 110 may, for instance, redirect a local browser on user computing device 140 to the resource's original URL (which may, e.g., have been rewritten by user protection computing platform 110, as discussed above).

Alternatively, if the computing platform determines that the first request does meet the one or more isolation conditions associated with the one or more isolation criteria, then at step 1025, the computing platform may initiate a browser mirroring session to provide limited access to the linked resource. For example, at step 1025, based on evaluating the first request for the first uniform resource locator associated with the first email message using the one or more isolation criteria, the computing platform may identify that the first request meets at least one isolation condition associated with the one or more isolation criteria. For instance, user protection computing platform 110 may identify that the first request meets at least one isolation condition associated with the one or more isolation criteria based on the evaluating performed at step 1010.

In addition, in response to identifying that the first request meets the at least one isolation condition associated with the one or more isolation criteria, the computing platform may initiate a browser mirroring session with the first user computing device to provide the first user computing device with limited access to a first resource corresponding to the first uniform resource locator associated with the first email message. For example, at step 1025, in response to identifying that the first request meets the at least one isolation condition associated with the one or more isolation criteria, user protection computing platform 110 may initiate a browser mirroring session with user computing device 140 to provide user computing device 140 with limited access to a first resource corresponding to the first uniform resource locator associated with the first email message. For instance, user protection computing platform 110 may initiate a browser mirroring session with user computing device 140 to provide user computing device 140 with limited access to the resource, similar to how user protection computing platform 110 may initiate such a browser mirroring session and/or execute an isolation method in the examples discussed above (e.g., by controlling and/or causing isolation server 120 to access web server 130 and provide limited access to the linked resource). For example, user protection computing platform 110 may load a DOM corresponding to the resource and/or other data received from the resource on the cloud (e.g., at user protection computing platform 110) where scripts and/or other dynamic code may be safely executed, and might only send static content and/or other safe/trusted content to user computing device 140 (e.g., by tagging and synchronizing the cloud DOM loaded on user protection computing platform 110 with the local DOM executed on user computing device 140).

In some embodiments, identifying that the first request meets the at least one isolation condition associated with the one or more isolation criteria may include cross-referencing a data table identifying specific resources to be opened using browser mirroring. For example, in identifying that the first request meets the at least one isolation condition associated with the one or more isolation criteria at step 1025, user protection computing platform 110 may cross-reference a data table identifying specific resources to be opened using browser mirroring. For instance, user protection computing platform 110 may store and/or maintain such a data table, which may be periodically and/or dynamically updated. In some instances, such the data table may be manually created and/or updated by a cybersecurity analyst and/or network administrator (e.g., a user of administrator computing device 160). Additionally or alternatively, the data table may be automatically determined by user protection computing platform 110, for instance, by training a classification model and/or other machine-learning algorithm on a labeled dataset that includes examples of legitimate resources, phishing sites, malware, malicious content, and/or other data associated with various resources, along with data indicating the consequences on a user and/or on enterprise information technology infrastructure if and/or when specific resources, including specific malicious resources, are interacted with and/or otherwise accessed. In some instances, in addition to identifying specific resources to be opened using browser mirroring, the data table also may indicate whether a user device is allowed to break isolation after a scan of the linked resource is completed. For example, the data table that is stored and/or maintained by user protection computing platform 110 may be similar to the following example table:

TABLE A

| Resource Type | Open in Isolation? | Allow Escape from Isolation? |
|---|---|---|
| Potentially malicious site | Yes, always. | Yes, if the live scan indicates that the site is not malicious. |
| File sharing site | Yes, if the user device is accessing the site from outside of the enterprise network or after working hours. | Yes, if the live scan indicates that the file being accessed on the file sharing site does not contain data in violation of a DLP policy. |
| Specific file types - high risk (e.g., EXE, JS, JAR) | Yes, always. | No. |
| Specific file types - low/ medium risk (e.g., DOC, DOCX, DOCM) | Yes, if the user device is accessing the file from outside of the enterprise network or after working hours. | Yes, if the live scan indicates that the file does not contain malware. |

At step 1030, the computing platform may scan the linked resource using a live analysis service. For example, at step 1030, after initiating the browser mirroring session with the first user computing device to provide the first user computing device with limited access to the first resource corresponding to the first uniform resource locator associated with the first email message, the computing platform may scan the first resource using a live analysis service that is configured to analyze information received from the first resource while a user of the first user computing device is accessing the first resource and return an indication of whether the first resource is safe or malicious.

For instance, after initiating the browser mirroring session with user computing device 140 to provide user computing device 140 with limited access to the first resource corresponding to the first uniform resource locator associated with the first email message, user protection computing platform 110 may scan the first resource using phish detection service **112*d* to analyze information received from the first resource while a user of user computing device 140 is accessing the first resource. In addition, phish detection service 112*d* may return an indication of whether the first resource is safe or malicious, as discussed in greater detail below. Advantageously, by scanning the first resource using phish detection service 112*d*, user protection computing platform 110 may allow the user of user computing device 140 to break out of isolation if the resource is safe (and, e.g., thereby free up computing resources on user protection computing platform 110 and improve the user experience for the user of user computing device 140) while also protecting the user of user computing device 140** and/or preserving the ability to take other cybersecurity actions if the resource is malicious.

In some embodiments, scanning the first resource using the live analysis service may include scanning user-authenticated content received from the first resource after the user of the first user computing device is authenticated by the first resource. For example, in scanning the first resource using the live analysis service (e.g., phish detection service **112*d*) at step 1030, user protection computing platform 110 may scan user-authenticated content received from the first resource after the user of user computing device 140 is authenticated by the first resource. Advantageously, by scanning user-authenticated content in this way (e.g., while the first resource is isolated from user computing device 140 as a result of the browser mirroring), user protection computing platform 110 may obtain a better, more accurate view of the resource and its behavior than might be gained if a conventional sandboxing approach (e.g., in which only non-authenticated content might be retrieved and/or analyzed by a monitoring and classification server) were used. This better, more accurate view provides various technical advantages, as user protection computing platform 110 can both more accurately identify resources that are actually malicious (e.g., particularly in instances where the malicious nature of a site or resource is not apparent until after the user is authenticated) while distinguishing resources that are actually safe and for which browser mirroring and/or other isolation is not required (e.g., so as to free up computing resources on user protection computing platform 110 and improve the user experience for the user of user computing device 140** and/or other users).

At step 1035, the computing platform may determine whether the linked resource is safe (e.g., based on the scanning performed by the live analysis service). For instance, user protection computing platform 110 may determine whether it has received an indication that the site is safe from phish detection service 112*d* or an indication that the site is malicious from phish detection service 112*d*. For example, at step 1035, user protection computing platform 110 may receive, from the live analysis service (e.g., phish detection service 112*d*), an indication that the first resource is safe. Alternatively, at step 1035, user protection computing platform 110 may receive, from the live analysis service (e.g., phish detection service 112*d*), an indication that the first resource is malicious.

If the computing platform determines that the linked resource is safe, then at step 1040, the computing platform may provide the user computing device with an option to break out of isolation. For example, at step 1040, in response to receiving the indication that the first resource is safe from the live analysis service (e.g., phish detection service 112*d*), user protection computing platform 110 may provide a user-selectable option to break out of isolation to user computing device 140. The user-selectable option to break out of isolation may, if selected, cause user protection computing platform 110 to end the browser mirroring session (and, e.g., thereby allow the user of user computing device 140 to directly access the linked resource), as in the examples discussed above.

Alternatively, if the computing platform determines that the linked resource is not safe, then at step 1045, the computing platform may capture and/or store data from the linked resource and/or perform other actions. For example, at step 1045, in response to receiving the indication that the first resource is malicious from the live analysis service (e.g., phish detection service 112*d*), user protection computing platform 110 may store data captured from the first resource. For instance, user protection computing platform 110 may store current and/or previous versions of the resource's DOM, other data received from the resource, data identifying the user's clickstream and/or other input to the resource, and/or other data. Any and/or all of this data may be used by user protection computing platform 110 in classifying and/or otherwise identifying malicious sites in connection with future requests. In some instances, if the computing platform determines that the linked resource is not safe, user protection computing platform 110 also may terminate the connection with the linked resource (e.g., so as to prevent and/or deny further access to the linked resource by user computing device 140 and/or isolation server 120).

In addition, at step 1050, the computing platform may provide the data captured from the linked resource to a machine learning engine (which may, e.g., be hosted on and/or executed on the computing platform). For example, at step 1050, in response to receiving the indication that the first resource is malicious from the live analysis service (e.g., phish detection service 112*d*), user protection computing platform 110 may provide the data captured from the first resource to a machine learning engine to train one or more machine learning models to recognize other malicious resources. The machine learning engine (which may, e.g., be hosted on and/or executed on user protection computing platform 110) may create and/or update one or more machine learning models for identifying malicious content. For instance, the machine learning engine (which may, e.g., be hosted on and/or executed on user protection computing platform 110) may train one or more classification models, neural networks, and/or machine-learning models based on the features associated with and/or data captured from actually malicious sites and/or other resources.

Subsequently, the computing platform may repeat one or more steps of the example method described above in processing other requests from the same user computing device and/or other user computing devices. For instance, user protection computing platform 110 may repeat one or more steps of the example method described above in processing a second request from user computing device 150. For example, user protection computing platform 110 may receive, via the communication interface (e.g., communication interface 113), from a second user computing device (e.g., user computing device 150), a second request for a second uniform resource locator associated with a second email message. Subsequently, user protection computing platform 110 may evaluate the second request for the second uniform resource locator associated with the second email message using one or more isolation criteria. Based on evaluating the second request for the second uniform resource locator associated with the second email message using the one or more isolation criteria, user protection computing platform 110 may identify that the second request meets at least one isolation condition associated with the one or more isolation criteria. In response to identifying that the second request meets the at least one isolation condition associated with the one or more isolation criteria, user protection computing platform 110 may initiate a browser mirroring session with the second user computing device (e.g., user computing device 150) to provide the second user computing device (e.g., user computing device 150) with limited access to a second resource corresponding to the second uniform resource locator associated with the second email message, similar to how user protection computing platform 110 may provide limited access to the first resource in the examples discussed above.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:

at least one hardware processor;

a communication interface; and memory storing computer-readable instructions that, when executed by the at least one hardware processor, cause the computing platform to:

receive, via the communication interface, from a first user computing device associated with an enterprise organization, a first request to open a first uniform resource locator associated with a first email message;

identify that the first uniform resource locator associated with the first email message corresponds to a first potentially-malicious site;

in response to identifying that the first uniform resource locator associated with the first email message corresponds to the first potentially-malicious site, determine, based on features of the first uniform resource locator, a risk profile for the first request to open the first uniform resource locator received from the first user computing device, wherein determining the risk profile associated with the first request to open the first uniform resource locator received from the first user computing device includes identifying a web category associated with the first uniform resource locator and determining that the first uniform resource locator associated with the first email message is associated with a specific web category by matching header content of a page corresponding to a site associated with the first uniform resource locator with information defined in one or more category templates, wherein determining the risk profile further includes identifying a predetermined score value corresponding to the specific web category, from a plurality of predetermined score values, each predetermined score value corresponding to a different respective web category, and comparing the identified predetermined score value with one or more predetermined thresholds to determine a level of risk associated with the first request; and based on the risk profile associated with the first request to open the first uniform resource locator received from the first user computing device, execute an isolation method to provide limited access to the first uniform resource locator associated with the first email message.

2. The computing platform of claim 1, wherein the first uniform resource locator associated with the first email message is an embedded link in the first email message that was rewritten, by an email filtering engine hosted on the computing platform, to point to the computing platform rather than a first resource associated with the first uniform resource locator, and wherein identifying that the first uniform resource locator associated with the first email message corresponds to the first potentially-malicious site comprises identifying that the first uniform resource locator associated with the first email message corresponds to the first potentially-malicious site using a URL defense (UD) tool hosted on the computing platform.

3. The computing platform of claim 1, wherein determining the risk profile associated with the first request to open the first uniform resource locator received from the first user computing device further comprises determining one or more user-specific risk factors associated with a user of the first user computing device.

4. The computing platform of claim 1, wherein executing the isolation method to provide limited access to the first uniform resource locator associated with the first email message comprises initiating a browser mirroring session with the first user computing device to provide the first user computing device with limited access to the first potentially-malicious site corresponding to the first uniform resource locator associated with the first email message.

5. The computing platform of claim 1, wherein executing the isolation method to provide limited access to the first uniform resource locator associated with the first email message comprises preventing the first user computing device from downloading one or more binary objects.

6. The computing platform of claim 1, wherein executing the isolation method to provide limited access to the first uniform resource locator associated with the first email message comprises preventing the first user computing device from uploading one or more binary objects.

7. The computing platform of claim 1, wherein executing the isolation method to provide limited access to the first uniform resource locator associated with the first email message comprises providing data associated with the first potentially-malicious site to a phishing analysis service that is configured to return an indication of whether the first potentially-malicious site is a phishing site.

8. The computing platform of claim 1, wherein executing the isolation method to provide limited access to the first uniform resource locator associated with the first email message comprises providing a user-selectable option to break out of isolation after data associated with the first potentially-malicious site is analyzed.

9. The computing platform of claim 1, wherein executing the isolation method to provide limited access to the first uniform resource locator associated with the first email message comprises controlling input to the first potentially-malicious site.

10. The computing platform of claim 1, wherein the memory stores additional computer-readable instructions that, when executed by the at least one hardware processor, cause the computing platform to:

receive, via the communication interface, from a second user computing device, a second request to open a second uniform resource locator associated with a second email message;

identify that the second uniform resource locator associated with the second email message corresponds to a second potentially-malicious site;

in response to identifying that the second uniform resource locator associated with the second email message corresponds to the second potentially-malicious site, determine a risk profile associated with the second request to open the second uniform resource locator received from the second user computing device and based on features of the second uniform resource locator; and based on the risk profile associated with the second request to open the second uniform resource locator received from the second user computing device, execute a second isolation method to provide limited access to the second uniform resource locator associated with the second email message.

11. A method, comprising:

at a computing platform comprising at least one hardware processor, a communication interface, and memory:

receiving, by the at least one processor, via the communication interface, from a first user computing device associated with an enterprise organization, a first request to open a first uniform resource locator associated with a first email message;

identifying, by the at least one processor, that the first uniform resource locator associated with the first email message corresponds to a first potentially-malicious site;

in response to identifying that the first uniform resource locator associated with the first email message corresponds to the first potentially-malicious site, determining, by the at least one processor and based on features of the first uniform resource locator, a risk profile for the first request to open the first uniform resource locator received from the first user computing device, wherein determining the risk profile associated with the first request to open the first uniform resource locator received from the first user computing device includes identifying a web category associated with the first uniform resource locator and determining that the first uniform resource locator associated with the first email message is associated with a specific web category by matching header content of a page corresponding to a site associated with the first uniform resource locator with information defined in one or more category templates, wherein determining the risk profile further includes identifying a predetermined score value corresponding to the specific web category, from a plurality of predetermined score values, each predetermined score value corresponding to a different respective web category, and comparing the identified predetermined score value with one or more predetermined thresholds to determine a level of risk associated with the first request; and based on the risk profile associated with the first request to open the first uniform resource locator received from the first user computing device, executing, by the at least one processor, an isolation method to provide limited access to the first uniform resource locator associated with the first email message.

12. The method of claim 11, wherein the first uniform resource locator associated with the first email message is an embedded link in the first email message that was rewritten, by an email filtering engine hosted on the computing platform, to point to the computing platform rather than a first resource associated with the first uniform resource locator, and wherein identifying that the first uniform resource locator associated with the first email message corresponds to the first potentially-malicious site comprises identifying that the first uniform resource locator associated with the first email message corresponds to the first potentially-malicious site using a URL defense (UD) tool hosted on the computing platform.

13. The method of claim 11, wherein determining the risk profile associated with the first request to open the first uniform resource locator received from the first user computing device further comprises determining one or more user-specific risk factors associated with a user of the first user computing device.

14. The method of claim 11, wherein executing the isolation method to provide limited access to the first uniform resource locator associated with the first email message comprises initiating a browser mirroring session with the first user computing device to provide the first user computing device with limited access to the first potentially-malicious site corresponding to the first uniform resource locator associated with the first email message.

15. The method of claim 11, wherein executing the isolation method to provide limited access to the first uniform resource locator associated with the first email message comprises preventing the first user computing device from downloading one or more binary objects.

16. The method of claim 11, wherein executing the isolation method to provide limited access to the first uniform resource locator associated with the first email message comprises preventing the first user computing device from uploading one or more binary objects.

17. The method of claim 11, wherein executing the isolation method to provide limited access to the first uniform resource locator associated with the first email message comprises providing data associated with the first potentially-malicious site to a phishing analysis service that is configured to return an indication of whether the first potentially-malicious site is a phishing site.

18. The method of claim 11, wherein executing the isolation method to provide limited access to the first uniform resource locator associated with the first email message comprises providing a user-selectable option to break out of isolation after data associated with the first potentially-malicious site is analyzed.

19. The method of claim 11, wherein executing the isolation method to provide limited access to the first uniform resource locator associated with the first email message comprises controlling input to the first potentially-malicious site.

20. One or more non-transitory computer-readable media storing instructions that, when executed by a computing platform comprising at least one hardware processor, a communication interface, and memory, cause the computing platform to:

receive, via the communication interface, from a first user computing device associated with an enterprise organization, a first request to open a first uniform resource locator associated with a first email message;

identify that the first uniform resource locator associated with the first email message corresponds to a first potentially-malicious site;

in response to identifying that the first uniform resource locator associated with the first email message corresponds to the first potentially-malicious site, determine, based on features of the first uniform resource locator, a risk profile for the first request to open the first uniform resource locator received from the first user computing device, wherein determining the risk profile associated with the first request to open the first uniform resource locator received from the first user computing device includes identifying a web category associated with the first uniform resource locator and determining that the first uniform resource locator associated with the first email message is associated with a specific web category by matching header content of a page corresponding to a site associated with the first uniform resource locator with information defined in one or more category templates, wherein determining the risk profile further includes identifying a predetermined score value corresponding to the specific web category, from a plurality of predetermined score values, each predetermined score value corresponding to a different respective web category, and comparing the identified predetermined score value with one or more predetermined thresholds to determine a level of risk associated with the first request; and based on the risk profile associated with the first request to open the first uniform resource locator received from the first user computing device, execute an isolation method to provide limited access to the first uniform resource locator associated with the first email message.

* * * * *